United States Patent
Marchio et al.

(10) Patent No.: US 8,895,177 B2
(45) Date of Patent: Nov. 25, 2014

(54) MODULAR BATTERY PACK SYSTEMS FOR PRISMATIC CELLS

(75) Inventors: Michael A. Marchio, Clarkston, MI (US); Frank A. Valdez, Auburn Hills, MI (US); Jozef Gorog, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 682 days.

(21) Appl. No.: 13/193,854

(22) Filed: Jul. 29, 2011

(65) Prior Publication Data

US 2012/0129024 A1 May 24, 2012

Related U.S. Application Data

(60) Provisional application No. 61/415,053, filed on Nov. 18, 2010.

(51) Int. Cl.

| H01M 2/10 | (2006.01) |
|---|---|
| H01M 2/20 | (2006.01) |
| H01M 10/48 | (2006.01) |
| H01M 10/6557 | (2014.01) |
| H01M 10/0525 | (2010.01) |
| H01M 10/647 | (2014.01) |
| H01M 10/625 | (2014.01) |
| H01M 10/613 | (2014.01) |
| H01M 2/12 | (2006.01) |

(52) U.S. Cl.
CPC .......... *H01M 2/1252* (2013.01); *H01M 10/482* (2013.01); *H01M 10/5059* (2013.01); *H01M 10/0525* (2013.01); *H01M 10/5032* (2013.01); *H01M 10/5016* (2013.01); *H01M 10/48* (2013.01); *H01M 10/5004* (2013.01); *Y02E 60/122* (2013.01); *H01M 10/486* (2013.01); *H01M 2/206* (2013.01)

USPC .............. 429/159; 429/53; 429/92; 429/120; 429/158

(58) Field of Classification Search
USPC .......... 429/123, 151–156, 158, 159, 161, 120
See application file for complete search history.

(56) References Cited

U.S. PATENT DOCUMENTS

| 5,140,744 A | 8/1992 | Miller .............................. 29/730 |
|---|---|---|
| 6,255,015 B1 | 7/2001 | Corrigan et al. .............. 429/149 |
| 6,821,671 B2 | 11/2004 | Hinton et al. ................. 429/120 |
| 2001/0007728 A1 | 7/2001 | Ogata et al. ................... 429/120 |
| 2005/0170239 A1 | 8/2005 | Uemoto et al. ............... 429/120 |

FOREIGN PATENT DOCUMENTS

| EP | 2068381 | 6/2009 | ............. H01M 2/10 |
|---|---|---|---|
| EP | 2210764 | 7/2010 | ............. B60L 11/18 |
| WO | 2007/079449 | 7/2007 | ............. H01M 2/10 |
| WO | 2009/073225 | 6/2009 | ............ H01M 10/50 |
| WO | 2009/140199 | 11/2009 | ................ H02J 7/32 |

*Primary Examiner* — Kenneth Douyette
*Assistant Examiner* — James Lee
(74) *Attorney, Agent, or Firm* — Maginot Moore & Beck LLP

(57) ABSTRACT

A modular frame includes a first row of cell slots configured to receive first prismatic cells of a battery pack system. A second row of cell slots is configured to receive second prismatic cells of the battery pack system. A central interface beam is disposed between the first row of cell slots and the second row of cell slots. The central interface beam includes a first side and a second side. The first side is configured to receive terminals of the first prismatic cells. The second side opposes the first side and is configured to receive terminals of the second prismatic cells.

19 Claims, 16 Drawing Sheets

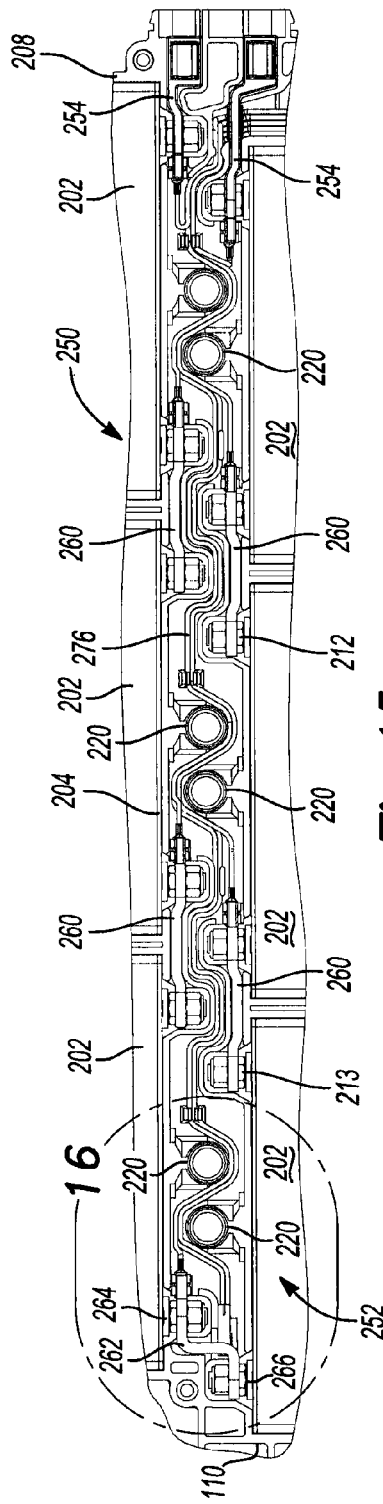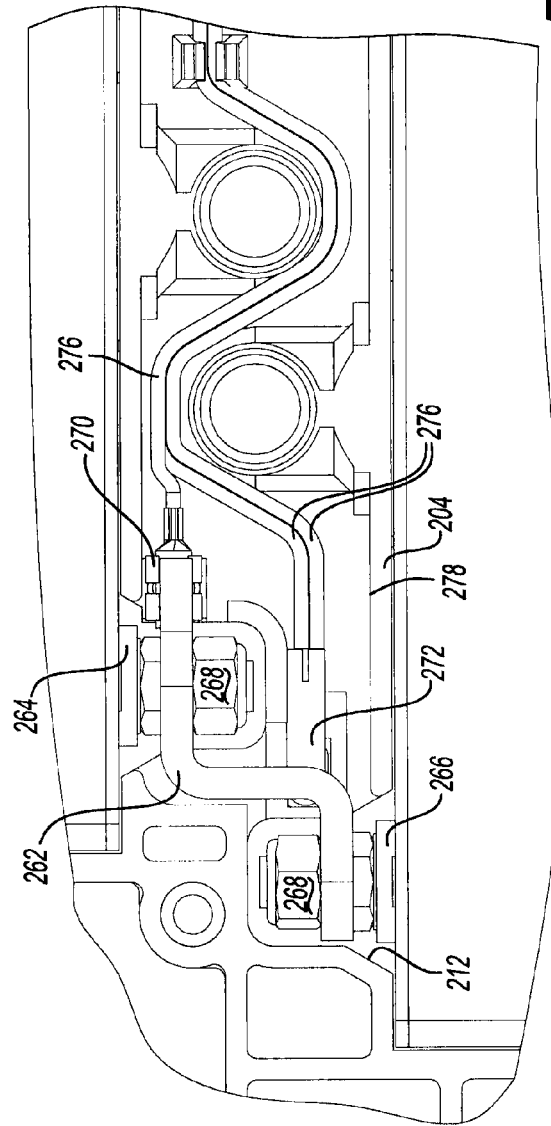

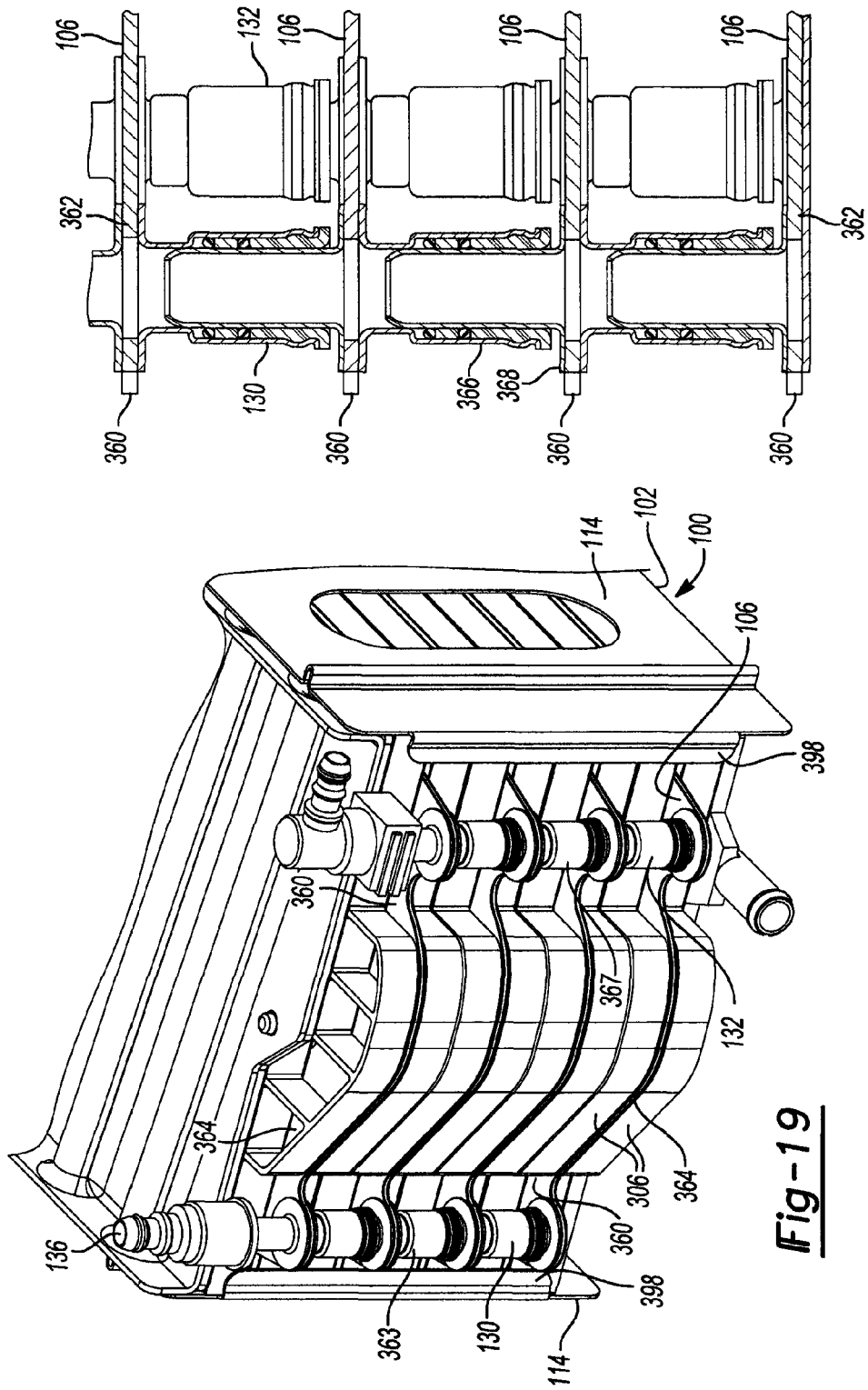

MODULAR BATTERY PACK SYSTEMS FOR PRISMATIC CELLS

CROSS-REFERENCE TO RELATED APPLICATIONS

This application claims the benefit of U.S. Provisional Application No. 61/415,053 filed on Nov. 18, 2010. The disclosure of the above application is incorporated herein by reference in its entirety.

FIELD

The present disclosure relates to battery pack systems for prismatic cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid electric vehicles (HEVs) and plug-in HEVs and electric vehicles (EVs) use multiple propulsion systems to provide motive power. The propulsion systems may include electric or battery powered systems that operate on power received from one or more battery packs. A battery pack may include, for example, one or more banks of high-voltage batteries (or cells). The cells are volumetric building blocks of the battery pack.

The cells of a battery pack are typically oriented in a vertical arrangement, such that terminals of the cells extend vertically upward from a top side of the batteries. In this arrangement, the terminals of the cells are accessible along an exterior side of the battery pack and can be exposed to and/or come in contact with debris or other foreign objects. This can negatively affect the performance of the battery pack.

A battery pack may include lithium ion cells. Operating temperatures of the cells can affect the lifespan and performance including charging and discharging efficiencies of the cells. A lithium ion cell may have a predetermined temperature operating range in which lifespan and performance of the cell are maximized. Temperature variations can arise between the cells of a battery pack for various reasons. For example, temperature variations can arise due to manufacturing differences between the cells, differences in locations of the cells within a battery pack, and thermal path differences of each cell relative to ambient air. For this reason, it can be difficult to maintain the cells at the same temperature.

Residual capacity of a cell can vary with change in temperature. Since there can be temperature variations between the cells of a battery pack, the cells can have different residual capacities. A cell with a larger amount of residual capacity may be over-charged, whereas a cell with a smaller amount of residual capacity may be over-discharged. This reduces the service life of the battery pack.

SUMMARY

A modular frame is provided and includes a first row of cell slots configured to receive first prismatic cells of a battery pack system. A second row of cell slots is configured to receive second prismatic cells of the battery pack system. A central interface beam is disposed between the first row of cell slots and the second row of cell slots. The central interface beam includes a first side and a second side. The first side is configured to receive terminals of the first prismatic cells. The second side opposes the first side and is configured to receive terminals of the second prismatic cells.

A battery pack system is provided and includes a first modular frame and a second modular frame. The first modular frame includes first prismatic cells. The second modular frame is adjacent to the first modular frame and includes second prismatic cells. At least one of an isolation film layer and a cooling plate is disposed between the first modular frame and the second modular frame. The at least one of the isolation film layer and the cooling plate isolate the first prismatic cells from the second prismatic cells.

A battery pack system is provided and includes a battery pack having a first side and a second side. The second side opposes the first side. The battery back includes modular frames that each includes prismatic cells. Electrical circuit elements are disposed on the first side and connected to the modular frames. The battery pack system further includes at least one of a cooling system and a venting system. A portion of the cooling system and the venting system is on the second side and is connected to the modular frames.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 15 is a top view of the central interface beam of FIG. 14;

FIG. 16 is a perspective view of a second portion of the central interface beam of FIG. 14 illustrating low-voltage connections in accordance with the present disclosure;

FIG. 19 is a rear perspective view of the battery pack system of FIG. 6 in accordance with the present disclosure;

FIG. 20 is a side perspective and cross-sectional view of a cooling connector assembly in accordance with the present disclosure;

DETAILED DESCRIPTION

Figure 1:
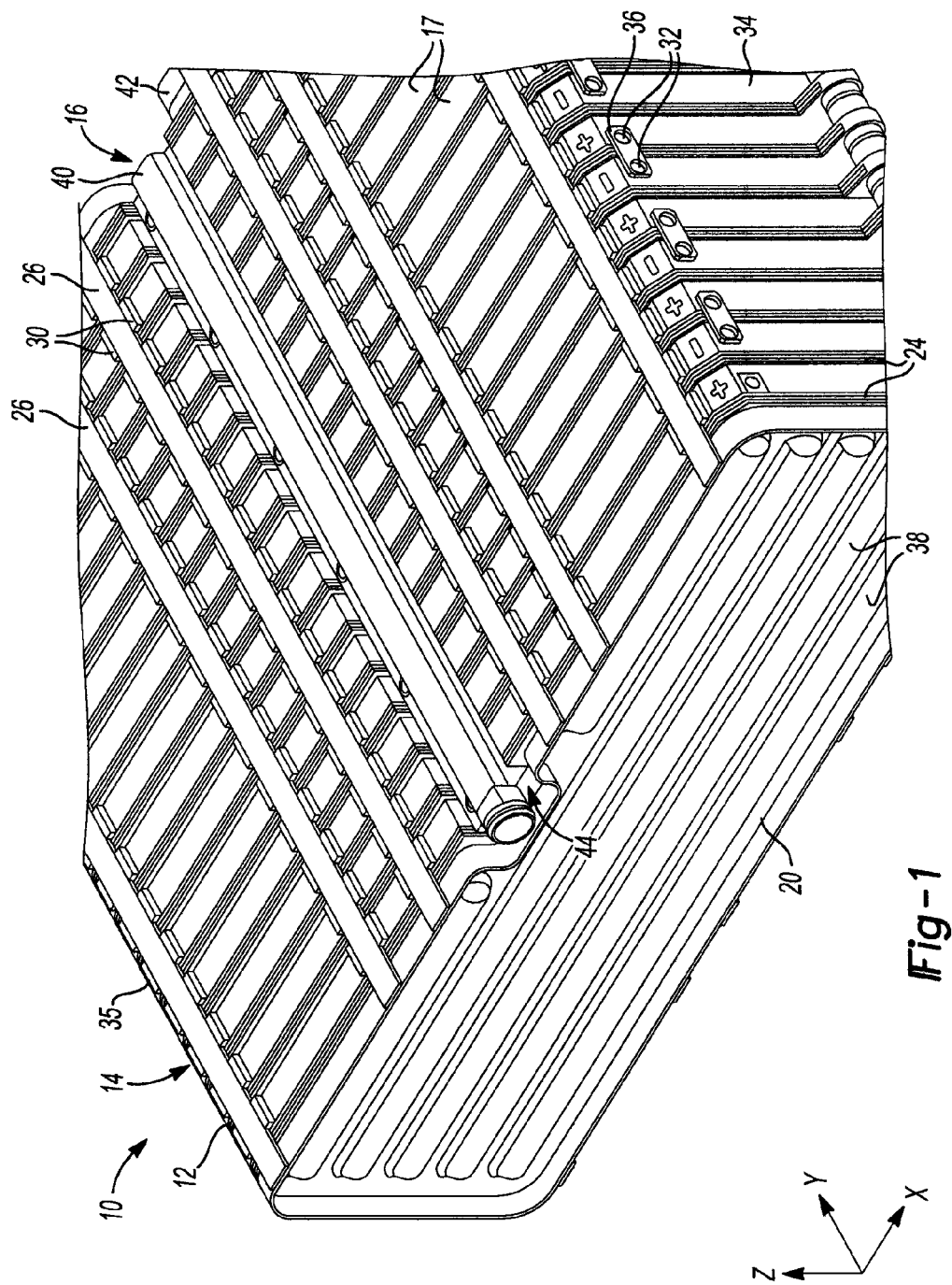
FIG. 1 is a perspective view of a battery pack system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In the following description, various modular frames are disclosed. The modular frames are shown as examples and may be modified for various implementations. For example, although the modular frames are shown with a particular number of cell slots for a particular number of cells, the modular frames may be scaled up or down to accommodate a different number of cells. Also, although the modular frames are shown for cells having a particular size and shape, the sizes and shapes of the modular frames may be modified to accommodate other cells. Also, the modular frames may be formed of various non-conductive materials (e.g., nylon, polypropylene (PP) or other polymer). This aids in isolating the cells from each other, from other system components and from materials or objects foreign to corresponding battery pack systems.

Figure 2:
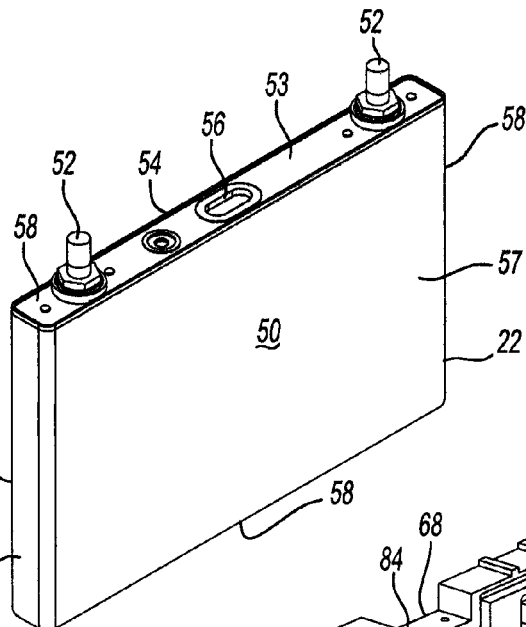
FIG. 2 is a perspective view of a prismatic cell in accordance with the present disclosure.

In FIG. 1, a perspective view of a battery pack system 10 is shown. The battery pack system 10 includes a battery pack 12, a cooling system 14 and a venting system 16. The battery pack 12 includes modular frames 17 that are serially connected and mounted two end plates 20. Each of the modular frames 17 holds multiple prismatic cells (hereinafter "cells"). An example cell 22 is shown in FIG. 2. The cooling system 14 includes isolation members 24 that are disposed between the modular frames 17.

The modular frames 17 are separated by the isolation members 24 (or cooling plates). In the example shown, the modular frames 17 and the isolation members 24 may be vertically oriented and are held in position between the end plates 20. The modular frames 17 are stacked horizontally in an alternating arrangement with the isolation members 24. Although the modular frames 17 and the isolation members 24 are each shown as being vertically oriented, this orientation of the modular frames 17 and the isolation members 24 is arbitrary as the battery pack system 10 may be rotated to provide a different orientation. The modular frames 17 and the isolation members 24 may be stacked and/or disposed along a first axis (Y-axis) and between retaining bands 26 along a second axis (Z-axis). The bands are used to prevent movement of the modular frames 17 and the isolation members 24 along the second axis and a third axis (X-axis).

The retaining bands 26 are connected to the end plates 20. The retaining bands 26 may be, for example, welded to the end plates 20. The modular frames 17 may include respective pairs of retention tabs 30 for each of the retaining bands 26. Each retaining band 26 is disposed between respective ones of the retention tabs 30 on each of the modular frames 17.

Each of the modular frames 17 has external terminals 32 (e.g., positive and negative high-voltage terminals) that receive power from the cells. A first one of the terminals is located on a first side (e.g., side 34) of the modular frames 17 and/or battery pack 12 and a second one of the terminals is located on a second side (e.g., side 35) of the modular frames 17 and/or battery pack 12. External terminals of adjacent ones of the modular frames are connected via bus bars 36. The external terminals on the same side of adjacent modular frames have opposite polarity, as shown. The bus bars 36 are shorter in length than traditional bus bars, which can extend across a battery pack and/or multiple cells. The reduced length of the bus bars 36 provides bus bars with less material and reduced resistance, mass, and weight.

Figure 21:
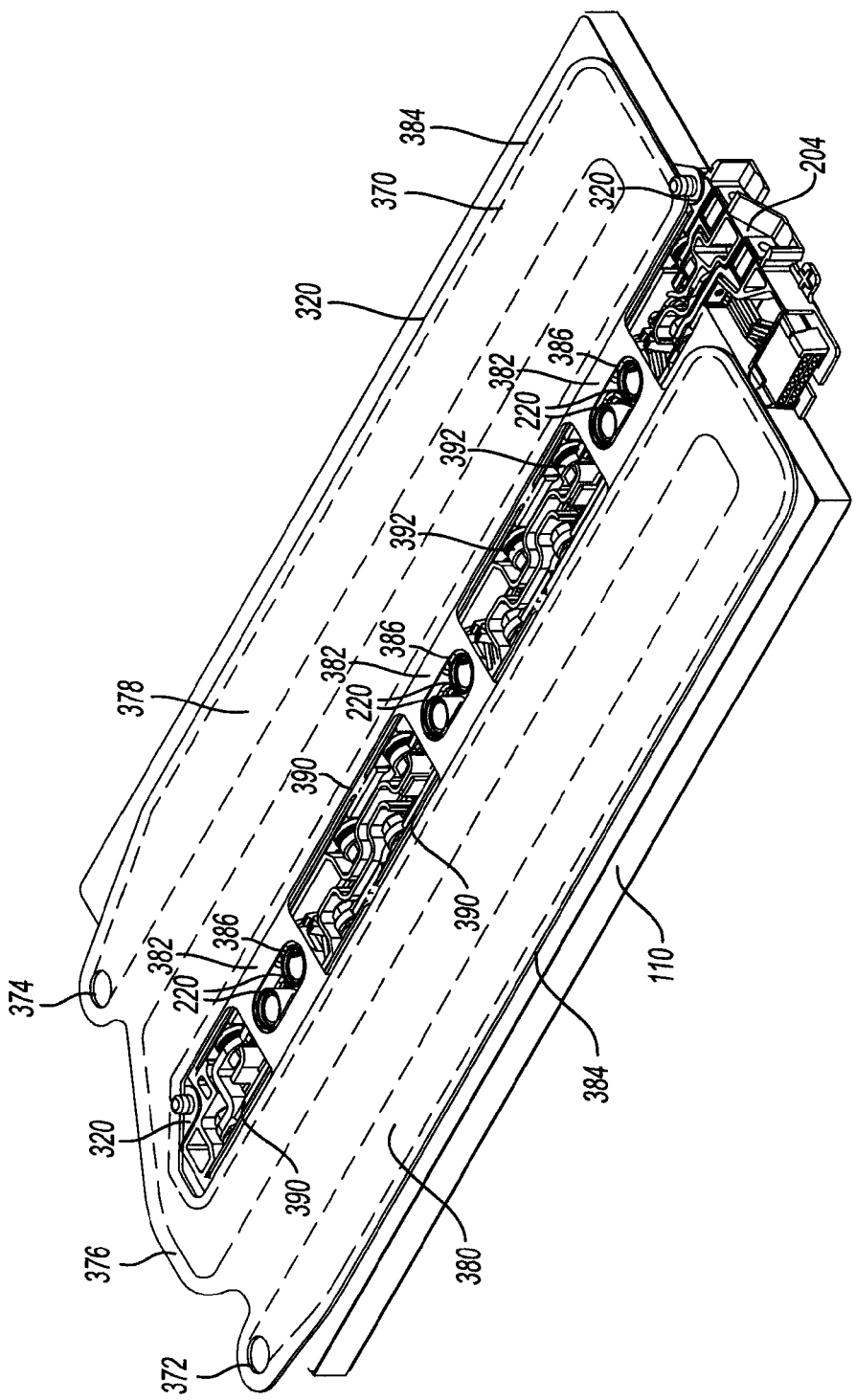
FIG. 21 is a perspective view of the 6-celled modular frame of FIG. 10 with a cooling plate in accordance with the present disclosure.
Figure 22:
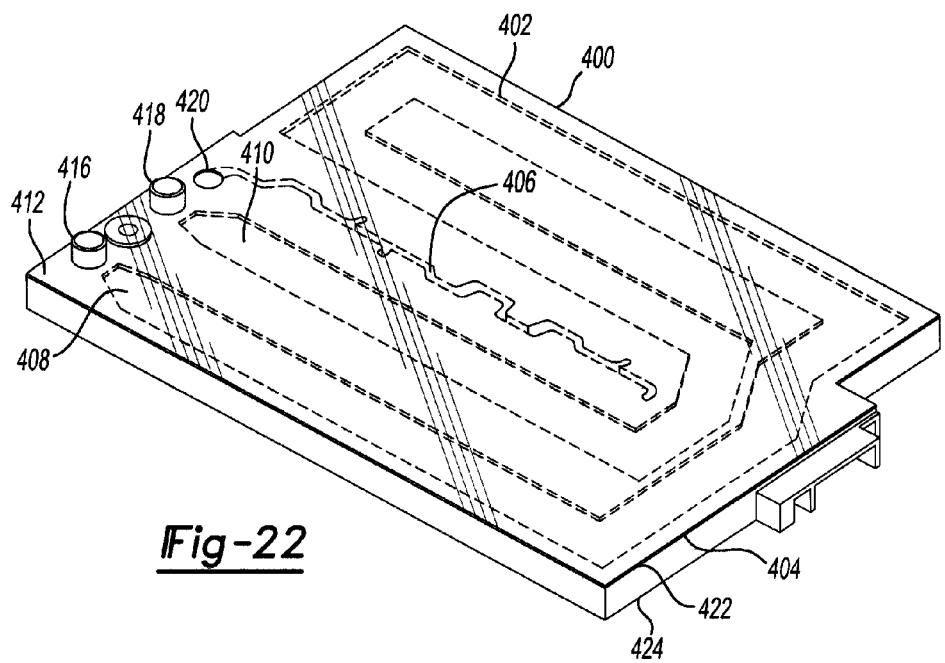
FIG. 22 is a perspective view of a modular frame with an integrally formed cooling channel in accordance with the present disclosure.
Figure 24:
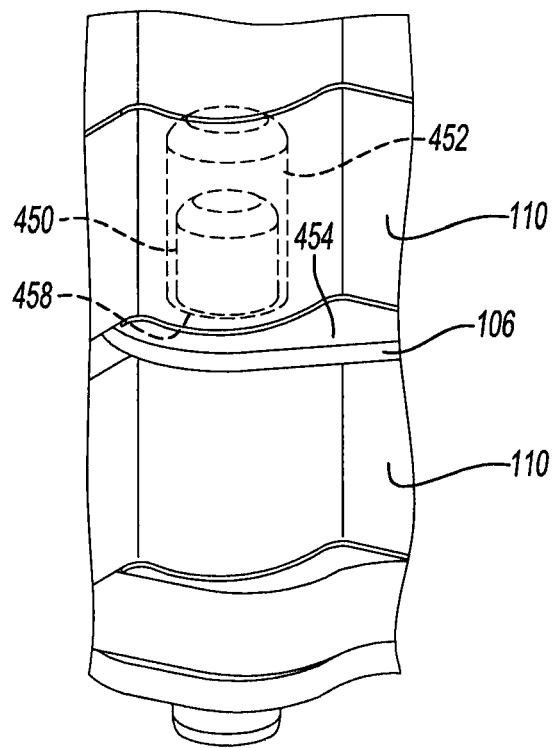
FIG. 24 is a perspective and assembled view of keyed cold plate members and modular frames of the battery pack system of FIG. 6 in accordance with the present disclosure.

The isolation members 24 separate and cool the cells of the modular frames 17. The isolation members 24 may be, for example, cooling plates that receive a cooling fluid. The cooling fluid may be in a gas or liquid state. Example cooling plates are shown in FIGS. 21 and 24 and may be modified to apply to the modular frames 17. The isolation members 24 may be integrally formed with the modular frames 17. For example, each isolation member 24 may be integrally formed with a respective one of the modular frames 17 as a unitary structure. An example of an isolation member that is integrally formed with a modular frame is shown in FIG. 22.

Figure 6:
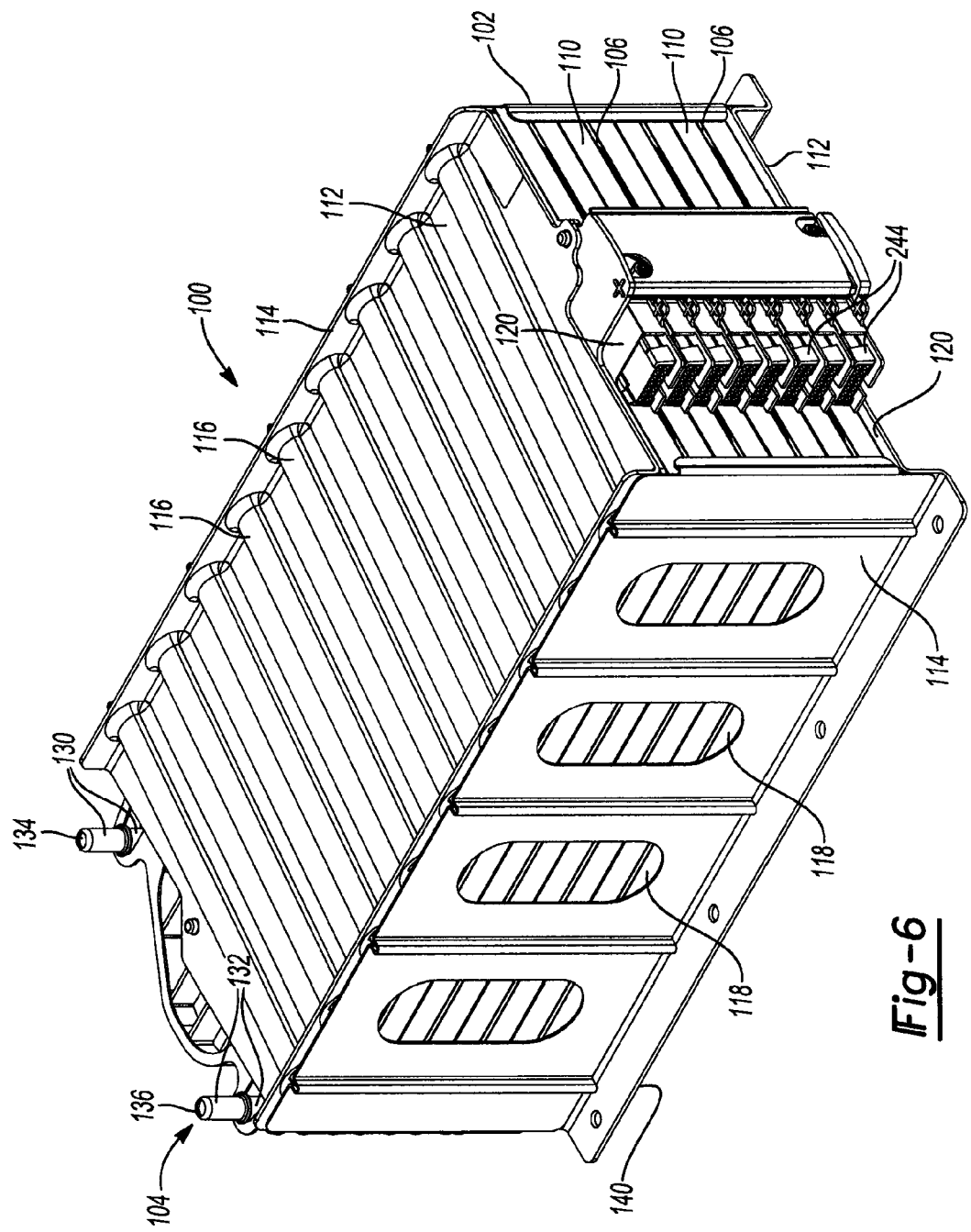
FIG. 6 is a perspective view of a battery pack system with an opposing terminal configuration in accordance with the present disclosure.

The modular frames 17 and the isolation members 24 may be held in compression between the end plates 20. The end plates 20 may include ribs 38 to provide rigidity for supporting compressive forces on the modular frames 17 and the isolation members 24. The end plates 20 may be grounded (i.e. connected to an earth or system ground) and provide a thermal barrier between ambient air and the cells of the modular frames adjacent to the end plates 20. Isolation end plates (not shown in FIG. 1) may be incorporated between each of the end plates 20 and the modular frames adjacent to the end plates 20. Example isolation end plates are shown in FIG. 6. The isolation end plates may be formed of a non-conductive material to minimize capacitance at the end plates 20.

The venting system 16 includes a vent channel assembly 40. In the example shown, the vent channel assembly 40 is located on a top side 42 of the battery pack 12, is mounted in a central recessed section 44 of the modular frames 17 and extends along the second axis (or Z-axis). The vent channel assembly 40 routes gas released from the cells away from the battery pack 12. The cells may release electrolytic gas when overcharged, which may be routed into and out of the vent channel assembly 40.

In FIG. 2, a perspective view of the cell 22 is shown. The cell 22 may be, for example, rectangular shaped and lithium-ion cell with a housing (or can) 50. As an example, the can 50 may be formed of aluminum. The cell 22 further includes a pair of high-voltage terminals 52 that extend from a top side 53 of the cell 22. The high-voltage terminals 52 may be of various styles. The high-voltage terminals 52 may be, for example, cylindrical, threaded, or flat. The top side 53 may be welded to the remainder of the can 50 along an outer peripheral edge 54 of the top side 53.

A release vent 56 is located on the top side 53 that opens and releases gas from within the cell 22 when the cell 22 is overcharged. The release vent 56 may include: a membrane that ruptures; a valve that opens; a plug that separates from the cell 22; and/or other venting elements.

The cell has two opposing sides 57 with large surface areas and four sides (or outer peripheral sides) 58 with a relatively small surface area. Cooling is provided on the sides 57, as described below.

Figure 3:
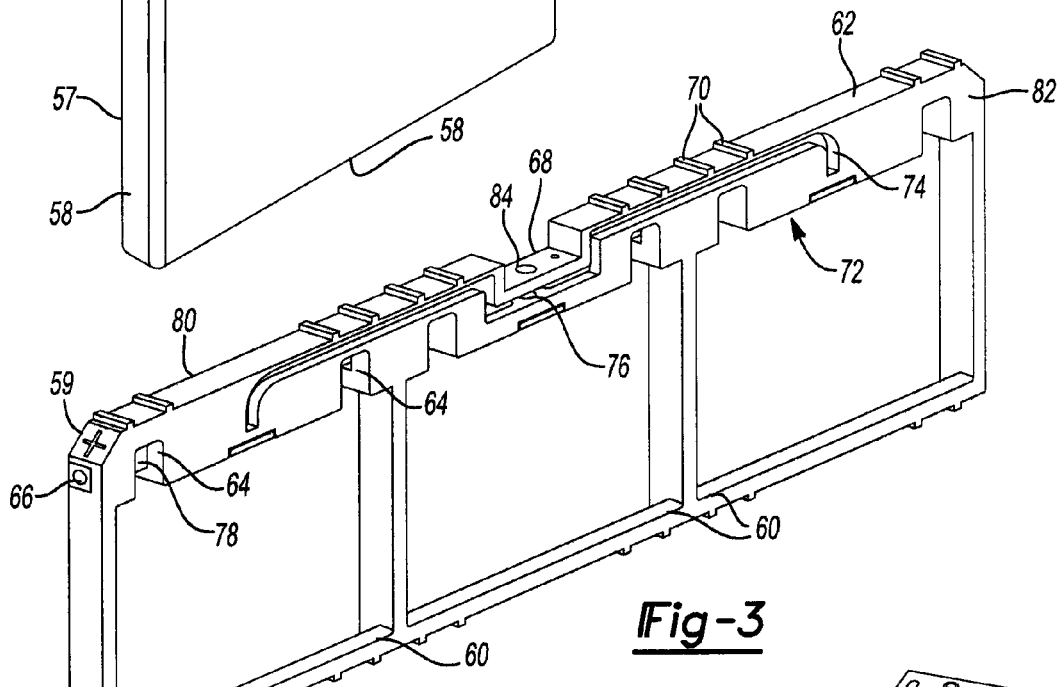
FIG. 3 is a perspective view of a 3-celled modular frame in accordance with the present disclosure.

In FIG. 3, a perspective view of a 3-celled modular frame 59 (hereinafter the modular frame 59) is shown. The modular frames 17 of FIG. 1 may be the same as the modular frame 59. The modular frame 59 includes cell slots 60 for receiving cells and an interface beam 62. The interface beam 62 is located on one side of the modular frame 59, extends across the cell slots 60 and receives the high-voltage terminals (e.g., high-voltage terminals 52 of FIG. 2) of the cells.

The interface beam 62 includes terminal slots 64, external terminals 66, a recessed section 68, retention tabs 70, and a venting circuit 72 with a venting channel (or cavity) 74 and vent holes 76. The terminal slots 64 include terminal connectors 78 that receive and connect to the terminals of a cell. The terminal connectors 78 are electrically connected to the external terminals 66 on a first side 80 of the interface beam 62, which is opposite a second side 82. The venting channel 74 is located on the second side 82. By having the external terminals 66 on an opposite side that the venting channel 74 is on, electrical components of the modular frames 59 are isolated from gases within the venting channel 74.

The venting circuit 72 may be formed of material(s) that are resilient to temperatures, pressures and chemical compositions of the materials and/or gases released from the cells. Materials of the venting circuit 72 may include non-conductive materials, such as PPE, nylon, and/or other polymer materials. As another example, the venting circuit 72 may alternatively or in addition include a conductive material (e.g., steel) to provide increased strength. If the venting circuit 72 includes a conductive material, the venting circuit 72 may be isolated from the cells and other elements of a battery pack system (e.g., the battery back system 10 of FIG. 1) via non-conductive portions of the modular frame 59. The venting circuit 72 may include different materials than other portions of the modular frame 59.

The venting channel 72 routes the gases released from the cells in the cell slots 60 from the vent holes 76 to an outlet vent hole 84 in the recessed section 68. The vent holes 76 are aligned with release vents (e.g., the release vent 56 of the cell 22 of FIG. 2) of the cells. The gases are directed from the recessed section 68 into a vent channel assembly (e.g., the vent channel assembly 40 of FIG. 1). The retention tabs 70 hold retaining bands, as shown in FIG. 3.

Figure 4:
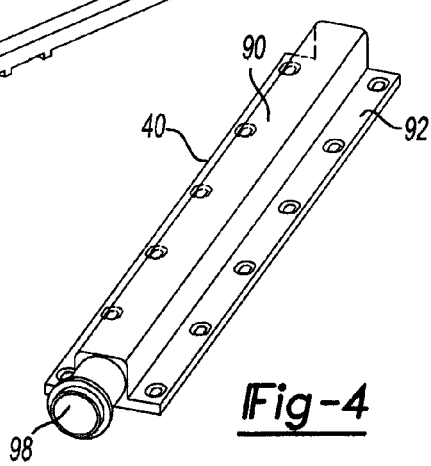
FIG. 4 is a top perspective view of a vent channel assembly in accordance with the present disclosure.
Figure 5:
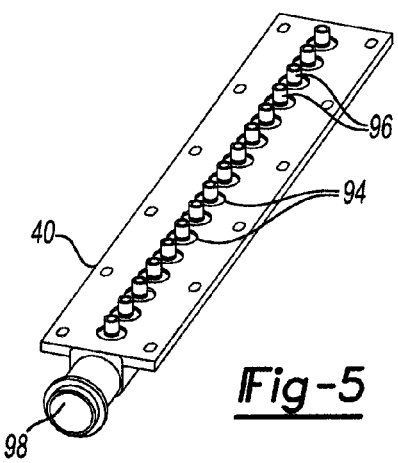
FIG. 5 is a bottom perspective view of the vent channel assembly of FIG. 4.

Referring now to FIG. 1 and to FIGS. 4 and 5, in which perspective views of the vent channel assembly (or vent manifold) 40 are shown. The vent channel assembly 40 is common (i.e. shared) by the modular frames 17. The vent channel assembly 40 includes a vent pipe 90 and a mounting bracket 92. The mounting bracket 92 is fastened to the modular frames 17, as shown in FIG. 1. The mounting bracket 92 includes vent holes 94 for receiving vent tubes 96 that extend from the vent pipe 90 into vent holes 94 in the central recessed section 44 of the battery pack 12 or in respective recessed sections (e.g., the recessed section 68 of FIG. 3) of the modular frames 17. The vent tubes 96 extend from the vent pipe 90 and receive gases from the interface beams (e.g., the interface beam 62 of FIG. 3) of the modular frames 17. Gases pass from the vent tubes 96 into the vent pipe 90 and then out an output 98 of the vent pipe 90.

In FIG. 6, a perspective view of a battery pack system 100 with an opposing terminal configuration is shown. The battery pack system 100 includes a battery pack 102, a cooling system 104 with cooling (or isolation) plates 106 and a venting system (examples of which are shown in at least FIGS. 8, 10 and 13). The battery pack 102 has modular frames 110 with respective cells (not shown in FIG. 6). Example modular frames are shown in FIGS. 7-11.

Figure 10:
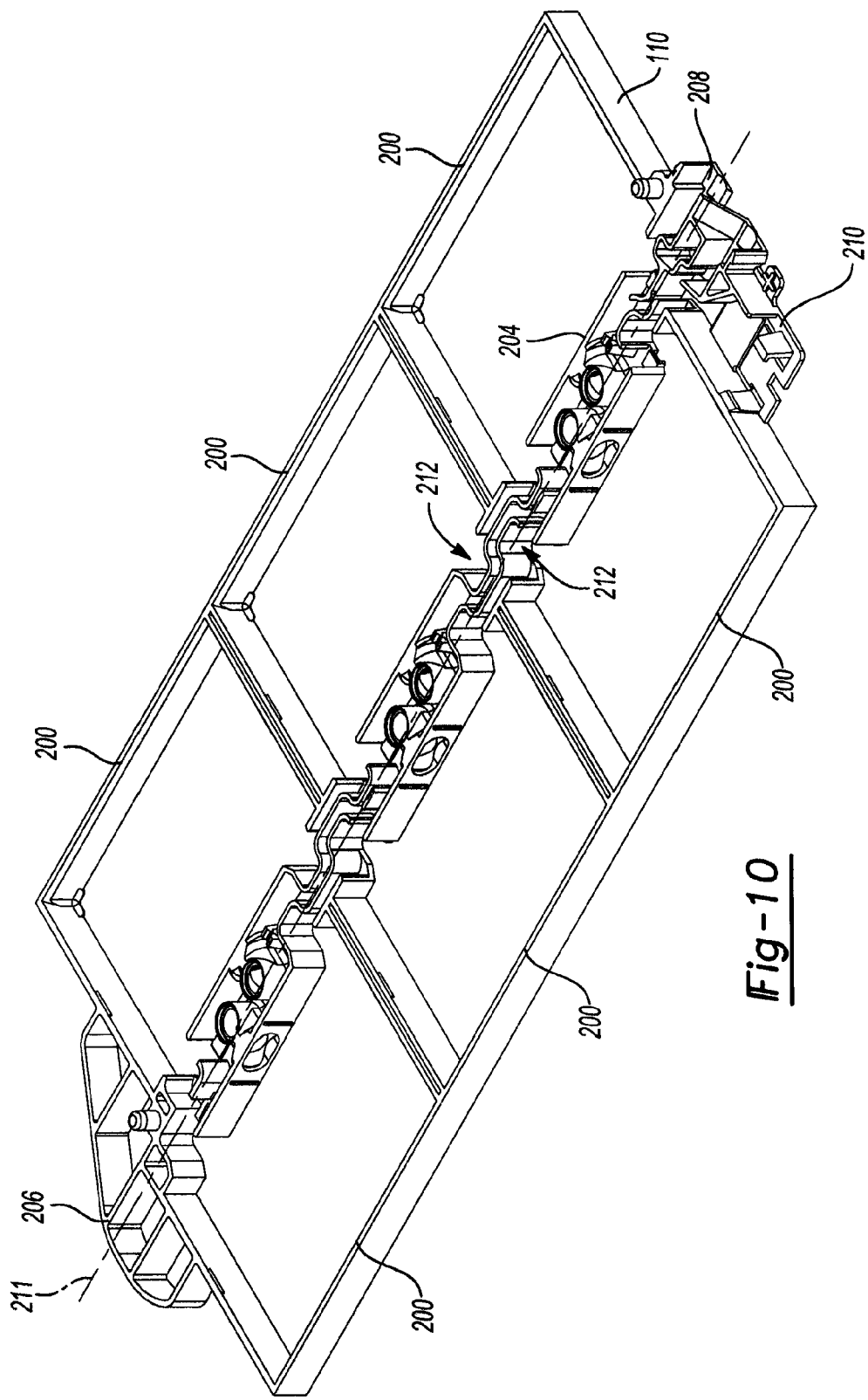
FIG. 10 is a perspective view of a 6-celled modular frame in accordance with the present disclosure.
Figure 11:
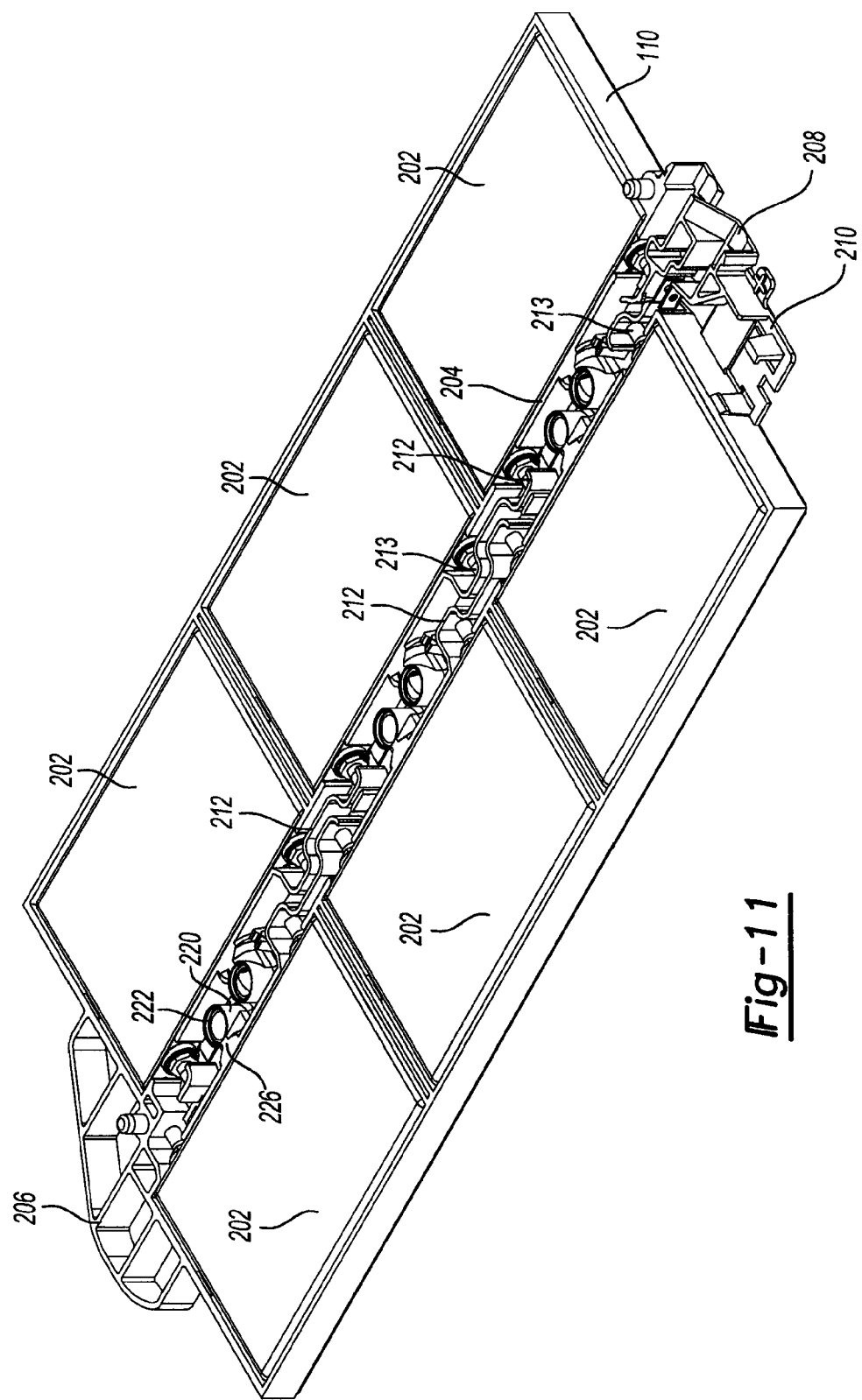
FIG. 11 is a perspective view of the 6-celled modular frame of FIG. 10 with plugged-in cells in accordance with the present disclosure.

In the example of FIG. 6, the modular frames 110 are 6-celled modular frames that are distinct from each other, as shown in FIGS. 10 and 11. The modular frames 110 are stacked in a vertically alternating arrangement with the cooling plates 106. Although the modular frames 110 and the cooling plates 106 are each shown as being horizontally oriented, this orientation of the modular frames 110 and the cooling plates 106 is arbitrary as the battery pack system 100 may be rotated to provide a different orientation.

The modular frames 110 and the cooling plates 106 are stacked between end plates 112. The end plates 112 are connected to side plates 114. The end plates 112 and the side plates 114 collectively may be referred to as a cassette and restrain the modular frames 110 and the cooling plates 106. The end plates 112 may be, for example, welded to the side plates 114. The modular frames 110 and the cooling plates 106 may be compressed between the end plates 112. The end plates 112 may include ribs 116 to increase rigidity to support compressive forces on the modular frames 110 and the corresponding cells. The side plates 114 provide lateral restraint and may include holes 118 for access to ambient air.

Isolation end plates 120 may be incorporated between each of the end plates 112 and the modular frames adjacent to the ending plates 112. Example isolation plates are shown in FIG. 6. The isolation end plates 120 are formed of a non-conductive material to minimize capacitance at the end plates. The isolation end plates 120 may be different than the cooling plates 106. For example, the isolation end plates 120 may not receive a cooling fluid, where as the cooling plates 106 may receive a cooling fluid, as further described below.

The cooling system 104 includes the cooling plates 106, which may have respective stackable inlet connectors 130 and outlet connectors 132. The inlet connectors 130 are stacked on each other to provide a single inlet port 134 for a cooling fluid. The outlet connectors 132 are stacked on each other to provide a single outlet port 136 for a cooling fluid. This is further shown in FIGS. 19 and 20.

The cooling plates 106 are disposed on cell sides with the greatest surface area. Although any of the sides of the cells in the modular frames 110 may be cooled, cooling is provided on cell sides with the largest surface area (referred to as the faces of the cells). This provides for efficient cooling of the cells by providing short paths for thermal energy to pass to a coolant in the cooling plates 106.

Figure 8:
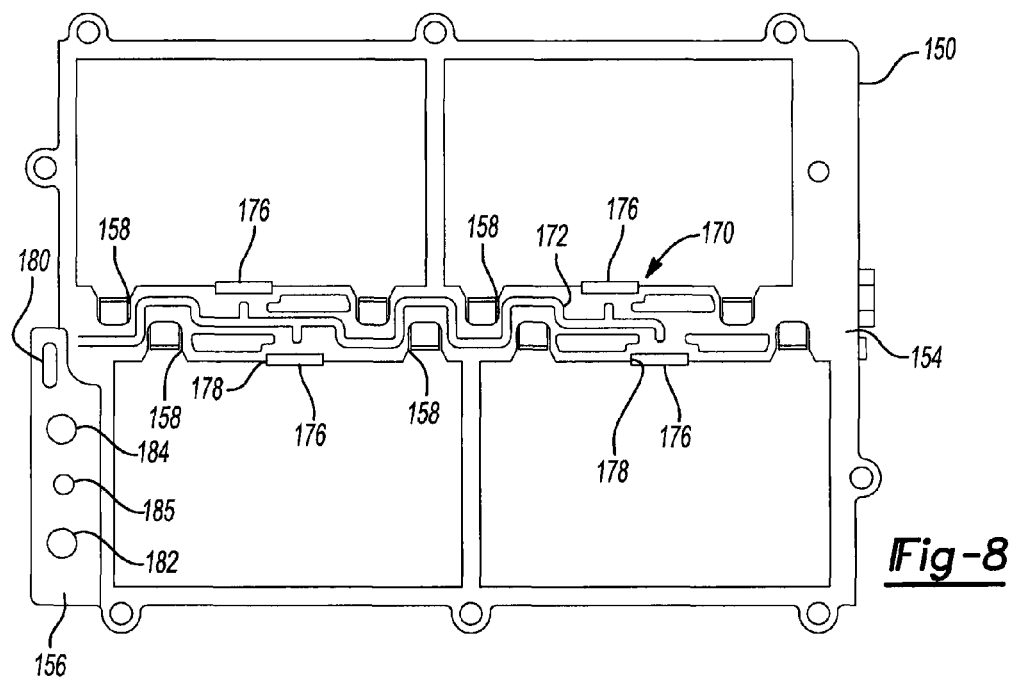
FIG. 8 is a bottom view of the 4-celled modular frame of FIG. 7.
Figure 13:
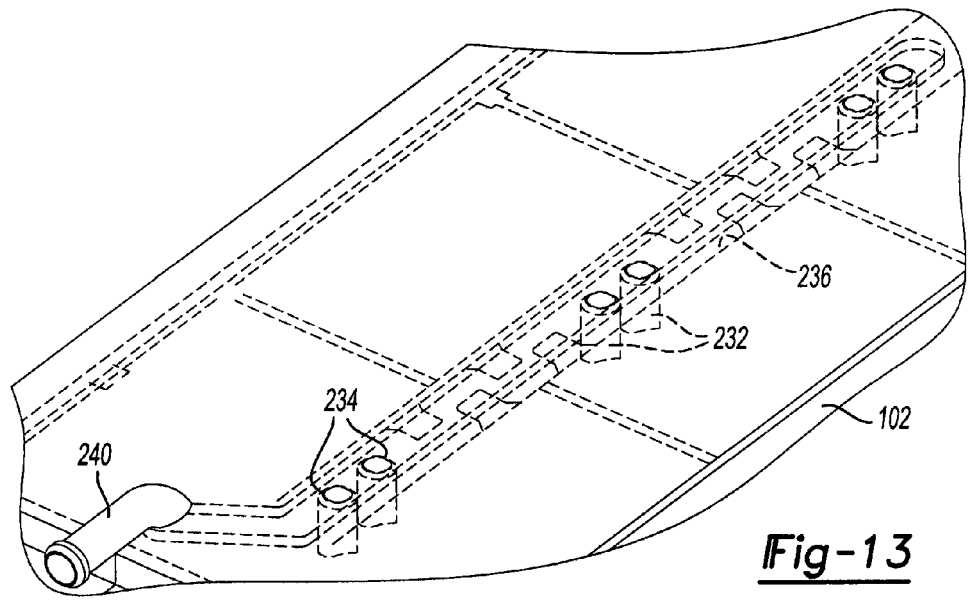
FIG. 13 is a bottom perspective view of the battery pack system illustrating a vent channels in accordance with the present disclosure.

The venting system includes interface bars of the modular frames 110 and a vent channel assembly (or manifold). Examples of the interface bars are shown in FIGS. 8, 10, 11. An example of the vent channel assembly is shown in FIG. 13 and may be on a bottom side 140 of the battery pack 102.

Figure 7:
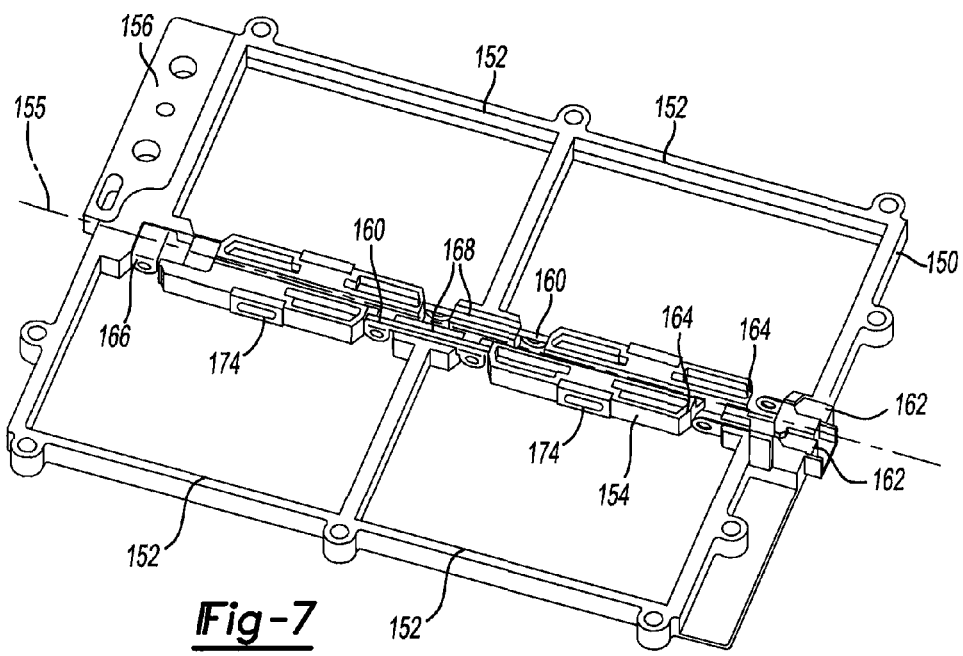
FIG. 7 is a top perspective view of a 4-celled modular frame in accordance with the present disclosure.

In FIGS. 7-8, perspective views of a 4-celled modular frame 150 (hereinafter referred to as "the modular frame 150") are shown. The modular frame 150 includes two rows of cell slots 152 for cells, a central interface beam 154, and a port bar 156. One row of the cell slots 152 are on each side of the central interface beam 154. The central interface beam 154 extends along a center line 155 of the modular frame 150 and includes terminal slots 158 for receiving terminals of the cells, which are held within the cell slots 152. The terminal slots 158 of the first row of the cell slots 152 are on an opposite side of the central interface beam 154 than the terminal slots of the second row of the cell slots 152. In this configuration, the terminals of the cells in the first row of the cell slots 152 extend toward the cells in the second row of the cell slots 152 and vice versa. This provides terminal connections along the central interface beam 154 and centrally located in a corresponding battery pack system.

The central interface beam 154 includes terminal interconnect bars 160 that extend between and connect to terminals of adjacent cells of the same row of the cell slots 152. External terminals 162 connect to terminals of the cells in terminal slots 164 near one side of the modular frame 150. A crossover bar 166 extends between and is connected to a first terminal of a first cell in the first row of the cell slots 152 and to a second terminal of a second cell in the second row of the cell slots 152. The crossover bar 166 is on an opposite side of the modular frame 150 and/or opposite end of the central interface beam 154 than the external terminals 162.

The terminal interconnect bars 160, the external terminals 162, and the crossover bar 166 are connected in series and may be inserted or molded directly into respective channels 168 in the central interface beam 154. The terminal interconnect bars 160, the external terminals 162, and the crossover bar 166 may alternatively be used to connect cells in parallel. For example, cells on a first side of the central interface beam 154 may be connected in parallel with cells on a second side of the central interface beam 154. As a result, the terminal interconnect bars 160, the external terminals 162, and the crossover bar 166 may be connected in parallel depending upon the connected (series or parallel) configuration of the cells. The external terminals 162 may be sealed and/or compression fit into the modular frame 150. The terminal interconnect bars 160, the external terminals 162, and the crossover bar 166 may be formed of an electrically conductive material(s), such as copper and/or aluminum and may be connected to the terminals of the cells via fasteners. In one implementation, the terminal interconnect bars 160, the external terminals 162, and/or the crossover bar 166 are welded to the terminals of the cells.

The configuration of the modular frame 150 includes offsetting the cells in the first row of the cell slots 158 from the cells in the second row of the cell slots 158. As such, the terminal slots (or recessed sections) 158 of the central interface beam 154 that are associated with the first row of the cell slots 152 are offset from other ones of the terminal slots 158 associated with the second row of the cell slots 152. This offset positioning: conserves space in the central interface beam 154; allows for the size of the central interface beam 154 to be minimized; and facilitates connecting terminals of the cells to the terminal interconnect bars 160, the external terminals 162, the crossover bar 166, and/or other terminal contacts within the central interface beam 154.

The terminal interconnect bars 160, the external terminals 162, and the crossover bar 166 may be welded (e.g., ultrasonic or laser welding) or fastened to the terminals of the cells. Each terminal of the cells may have a respective fastener. The terminal interconnect bars 160, the external terminals 162, and/or the crossover bar 166 may be connected to the terminals of the cells prior to inserting the cells into the modular frame 150. In this implementation, the terminal interconnect bars 160, the external terminals 162, the crossover bar 166 and/or the cells are inserted into the modular frame 150 subsequent to being connected to each other. As an alternative, the terminal interconnect bars 160, the external terminals 162, the crossover bar 166 and/or the cells may be inserted into the modular frame 150 prior to being connected to each other.

The central interface beam 154 also includes a venting circuit 170 with a vent channel 172. The venting circuit 170 is common ("shared") by the cells of the modular frame 150 and is an intrinsic part of the modular frame 150. The vent channel 172 extends between vent holes 174, along a length of the central interface beam 154, and around the terminal slots (or first recessed sections) 158 of the central interface beam 154. The portion of the central interface beam 154 that includes the venting circuit 170 may be referred to as a vent manifold. The vent holes 174 may be located in vent seals 176 and/or in the central interface beam 154. The vent seals 176 are in second recessed sections 178 of the central interface beam 154 and provide a gas tight seal between the central interface beam 154 and the cells. The second recessed sections 178 are located over release vents in the cells. The vent holes 174 are aligned with the release vents of the cells and receive gases from the cells.

The vent channel 172 routes the gases to a single outlet port 180 in the port bar 156. The single outlet port 180 may be connected to other outlet ports of adjacent modular frames to form an outlet channel providing a single venting outlet for the battery pack system. The vent channel 172 may be on an opposite side of the central interface beam 154 than the terminal interconnect bars 160, the external terminals 162, and the crossover bar 166. This separates the gases from high-voltage electrical components.

The port bar 156 may also include inlet and outlet ports 182, 184 for passage of a cooling fluid between cooling plates. The cooling plates may be disposed between the modular frames and between cell sides with the largest surface areas. The port bar 156 provides a single location for the passage of fluids to and from the modular frame 150. The port bar 156 may be located on an opposite side of the modular frame 150 than the external terminals 162.

The port bar 156 may also include a thru hole 185 for mounting a fastener (e.g., bolt). The fastener may extend through adjacent modular frames and provide restraint in the area of the port bar 156. This may aid in maintaining connections between ports of adjacent modular frames.

Figure 9:
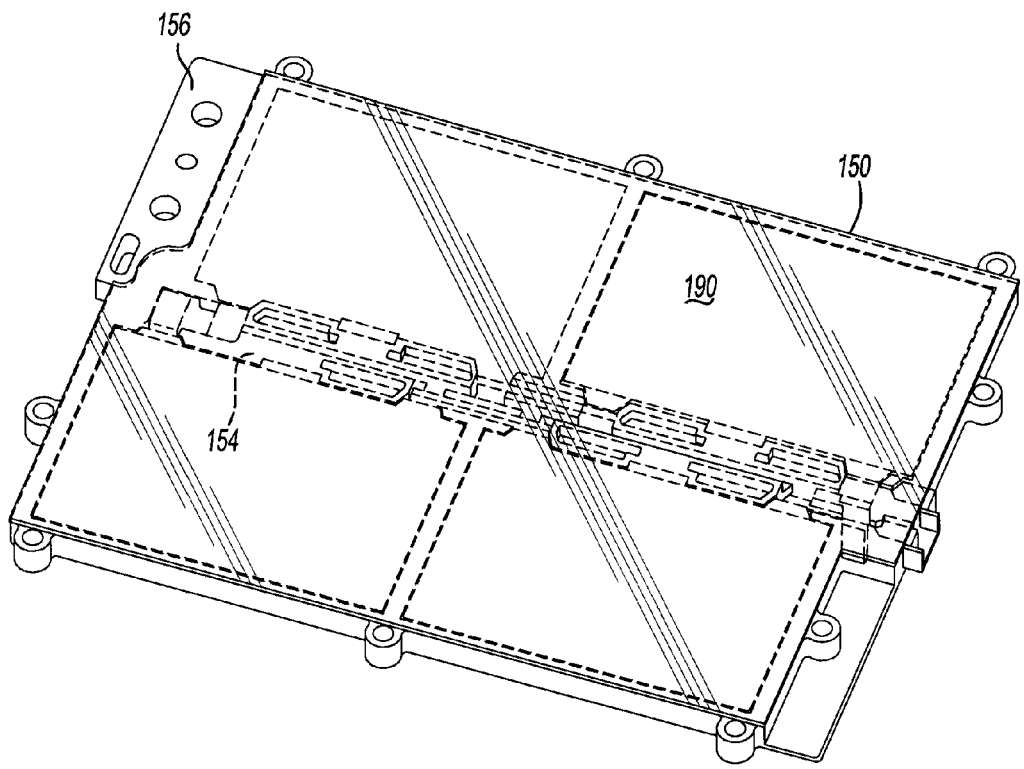
FIG. 9 is a top perspective view of the 4-celled modular frame of FIG. 4 illustrating an isolation film layer in accordance with the present disclosure.

In FIG. 9, a perspective view of the modular frame 150 is shown illustrating an isolation film layer 190. The isolation film layer 190 may be applied on each side of the modular frame 150 corresponding to the faces of the cells. A similar isolation film layer may be applied on each side of other modular frames disclosed herein. The isolation film layer 190 is non-conductive and covers the faces of the cells. The isolation film layer 190 may be attached, for example, using adhesive(s) or by welding (e.g., laser welding, ultrasonic welding, vibration welding, etc.).

The isolation film layer 190 isolates the cells from cold plates and adjacent cells and prevents ingress of moisture and/or other contaminates into the modular frame 150. The isolation film layer 190 covers the cells and the central interface beam 154, but does not cover the port bar 156. This isolates the cells while allowing the port bar 156 to be connected to adjacent port bars of other modular frames and allows fluids (liquids and gases) to flow between the port bars. The isolation film layer 190 seals the modular frame 150 and allows the modular frame 150 to be mated to a cooling plate or other cooling device.

Figure 12:
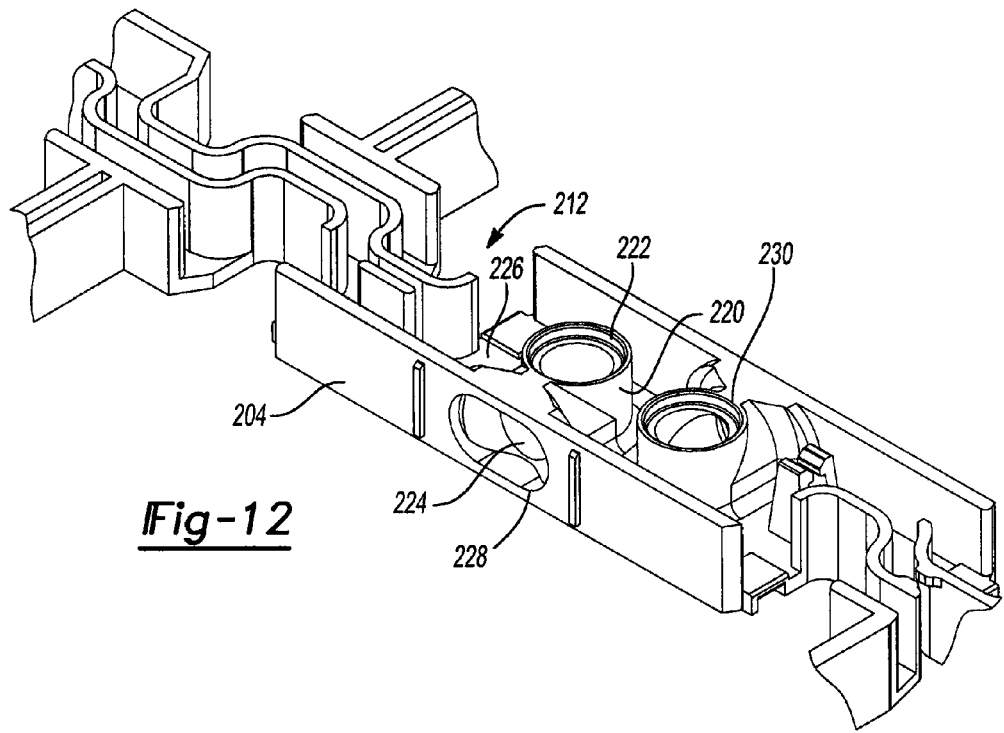
FIG. 12 is a perspective view of a portion of the 6-celled modular frame of FIG. 10 illustrating venting assembly in accordance with the present disclosure.

In FIGS. 10-12, perspective views of the modular frame 110 are shown. The modular frame 110 includes cell slots 200 for cells 202, a central interface beam 204, a cold plate extension 206, a high-voltage terminal housing 208 and a low-voltage connector bracket 210. The modular frame 110 includes two rows of cell slots, one on each side of the central interface beam 204. The central interface beam 204 extends along a center line 211 of the modular frame 110 and includes terminal slots (or recessed sections) 212 for receiving terminals 213 of the cells 202, which are held within the cell slots 200. The terminal slots 212 of the first row of the cell slots 200 is on an opposite side of the central interface beam 204 than the other one of the terminal slots 212 of the second row of the cell slots 200. In this configuration, the terminals 213 in the first row of the cell slots 200 extend toward the cells in the second row of the cell slots 200 and vice versa. This provides opposing terminal connections along the central interface beam 204.

The central interface beam 204 includes a vent connector 220 for each of the cell slots 200. Each of the vent connectors 220 includes a stackable portion 222 and an input tube 224. The input tubes 224 extend into adaptor blocks 226. The adaptor blocks 226 attach to, seal with, and/or are held over release vents of the cells. The adaptor blocks 226 include vent holes 228 that receive gases from the cells. The vent connectors 220 include a receptacle end 230 and an insert end (not shown). The insert ends are on an opposite sides of the vent connectors 220 than the receptacle ends 230.

The insert ends have outer diameters that are less than or equal to inner diameters of the receptacle end 230. This allows the insert ends of a first modular frame to be pushed into the receptacle ends 230 of an adjacent modular frame. In the example shown, the receptacle ends 230 extend away from the modular frame 110 to connect to adjacent vent connectors of another modular frame. Similarly, the insert ends may extend away from the modular frame 110 to connect to adjacent vent connectors of another modular frame. The insert ends of a first modular frame are pushed into the receptacle ends 230 of an adjacent modular frame. This allows the vent connectors of the modular frames to be stacked to form venting channels (or trunk lines). Example venting channels 232 are shown in FIG. 13.

The venting channels are terminated on a first (or top) side of a battery pack (e.g., top side of the battery pack 102 of FIG. 6) and include outputs 234 on a second (or bottom) side of the battery pack. The outputs 234 are connected to a vent manifold (or vent channel assembly) 236 at the bottom of the corresponding battery pack system (e.g., the battery pack system 100), as shown in FIG. 13. The vent manifold 236 receives gases from the stacked vent connectors 220 and directs the gases out a single vent tube 240. The stacked vent connectors 220 and the vent manifold 236 may collectively be referred to as a venting circuit. Incorporation of the venting channels instead of the vent channel of the type shown in FIG. 8, allows for deeper and/or larger channels in the central interface beam 204 for wires, such as sensor wires.

Figure 18:
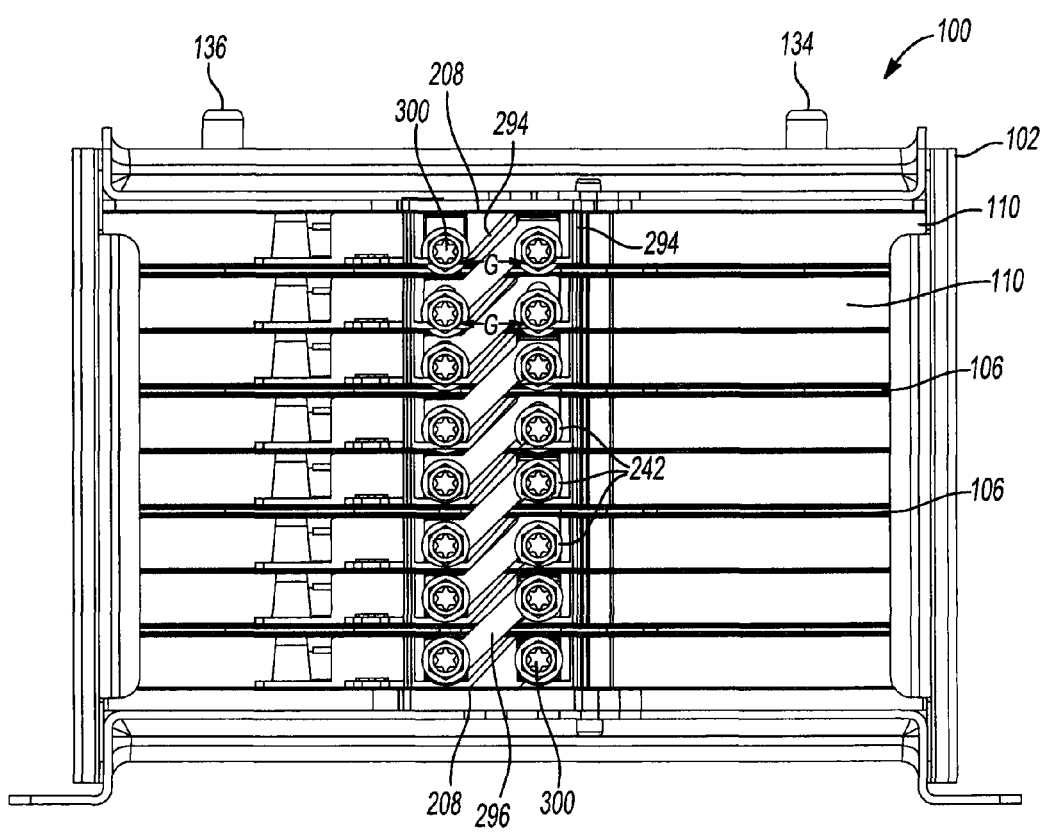
FIG. 18 is a front view of the battery pack system of FIG. 6 in accordance with the present disclosure.

The cold plate extension 206 provides support for a portion of the cooling plates located between the modular frames 110 of the battery pack system 100 of FIG. 6. This is further described below with respect to FIGS. 19-21. The high-voltage terminal housing 208 holds high-voltage terminals (e.g., one with positive polarity and one with negative polarity). Example high-voltage terminals 242 are connected to the external terminals 162 of FIG. 7. The high-voltage terminals 242 are connected to adjacent terminals of two cells in the modular frame 110. A stack up of the high-voltage terminal housings 208 showing high-voltage terminals 242 are shown in FIG. 18. The high-voltage terminals 242 are located in a single plane on a single side of the battery pack 102.

The low-voltage connector bracket 210 holds a low-voltage connector 244. As shown in FIG. 6, ends of the low-voltage connectors 244 of the batter pack system 100 may be located within a single plane and on a single side of the battery pack 102. The low-voltage connectors 244 may be located on the same side as the high-voltage terminals 242. Each of the low-voltage connectors 244 receives wires that are routed along respective central interface beams (e.g., the central interface beam 204) to cell terminals and/or sensors within the central interface beams. The wires are routed to minimize electromagnetic compatibility (EMC)/electromagnetic interference (EMI) issues. This is further described below with respect to FIGS. 15-17.

In FIG. 11, the modular frame 110 is shown with the cells 202 positioned in the cell slots 200. The configuration of the modular frame 110 includes locating the cells in a first row offset from cells in a second row. As such, the recessed sections 212 that receive the terminals 213 of the cells in the first row are offset from recessed sections, which receive terminals 213 of the cells in the second row. This offset positioning: conserves space in the central interface beam 204; allows for the size of the central interface beam 204 to be minimized; and eases connecting terminals of the cells to terminal interconnect bars, external terminals, a crossover bar, and/or other terminal contacts within the central interface beam 204. Examples of terminal interconnect bars, external terminals and a crossover bar are shown in FIGS. 15 and 16.

Although not shown in FIG. 11, an isolation film layer may be applied to sides of the modular frame 110 to cover faces of the cells 202. The isolation film layer may be similar to the isolation film layer 190 of FIG. 9. The isolation film layer 190 may not extend over the cold plate extension 206, but may extend over the high-voltage terminal housing 208 and the low-voltage connector bracket 210.

Figure 14:
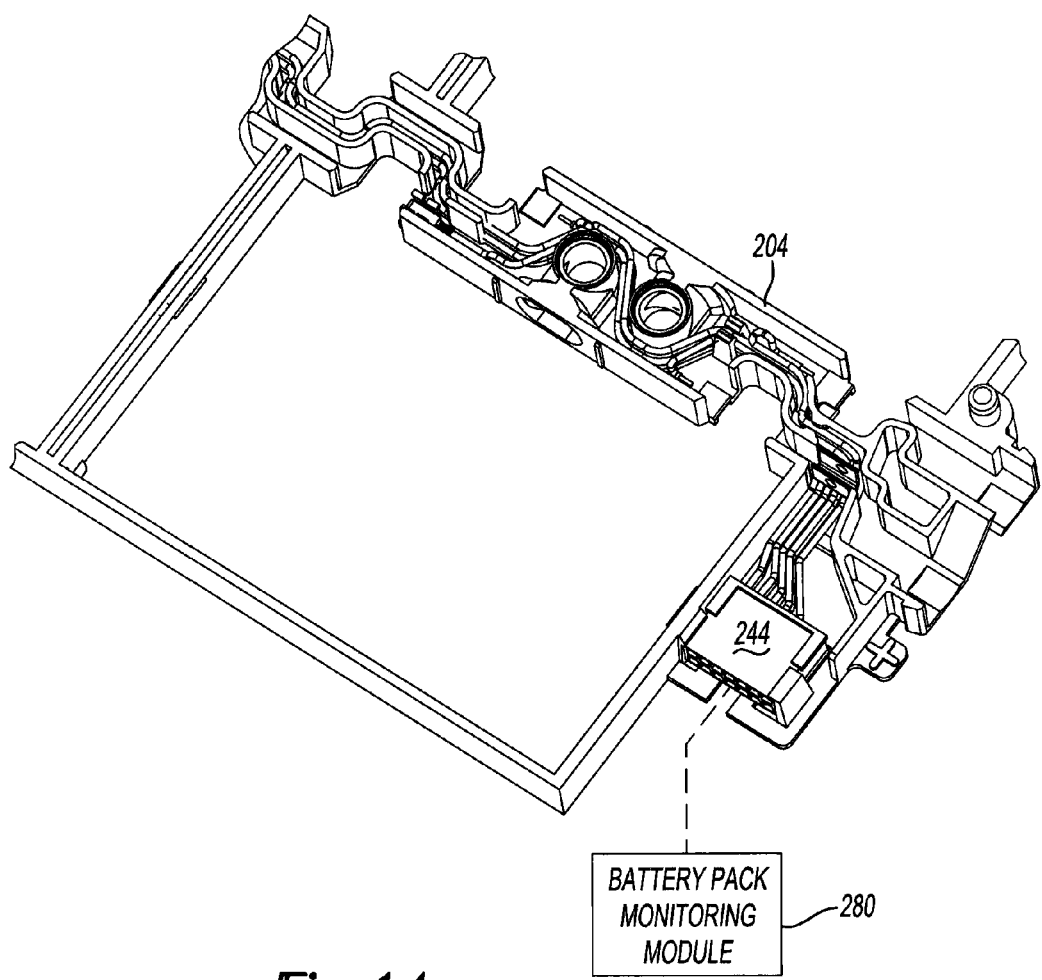
FIG. 14 is a perspective view of a first portion of a central interface beam illustrating an electrical circuit in accordance with the present disclosure.

Referring now also to FIGS. 14-16, perspective and top views of the central interface beam 204 are shown illustrating a high-voltage circuit 250, a low-voltage circuit 252 and associated connections. The high-voltage circuit 250 is associated with receiving power from each of the cells 202 and providing the collective power from the cells 202 to two external terminals 254. The external terminals 254 are held by the high-voltage terminal housing 208 on a single side of one of the modular frames 110. The low-voltage circuit 252 is associated with detecting states of the cells 202, such as temperature and voltage of each of the cells 202. The cells 202 are connected in series and thus the voltage at the external terminals 254 is equal to a sum of the voltages provided by the cells 202. For example, each of the cells may have an approximate voltage of 3.7V±0.2V and the voltage provided to the external terminals 254 may be approximately 22.2V±1.2V. The low-voltage circuit 252 may be associated with voltages less than, for example, 48V. In one implementation, the low-voltage circuit 252 includes voltages less than or equal to 12V.

As an alternative, the cells or sets of the cells may be connected in parallel and each cell or set of cells sharing a common voltage.

The high-voltage circuit 250 includes terminal interconnect bars 260 that extend between and connect to terminals of adjacent cells of the same row of cell slots. A crossover bar 262 extends between and is connected to one of the terminals (e.g., the terminal 264) in the first row and another terminal (e.g., terminal 266) in the second row. The crossover bar 262 is on an opposite side of the modular frame 110 or opposite end of the central interface beam 204 than the external terminals 254. The external terminals 254, the terminal interconnect bars 260, and the crossover bar 262 are connected in series and may be inserted or molded directly into the modular frame 110. The external terminals 254 may be sealed into the modular frame 110. The external terminals 254, the terminal interconnect bars 260, and the crossover bar 262 may be formed of an electrically conductive material(s), such as copper and/or aluminum and may be connected to the terminals 213 of the cells 202 via fasteners 268, as shown. In one implementation, the external terminals 254, the terminal interconnect bars 260, and/or the crossover bar 262 are welded to the terminals 213.

As the cells 202 are connected in series and arranged in opposing rows, with adjacent terminals of the cells 202 connected to each other, the lengths of the terminal interconnect bars 260 and the crossover bar 262 are minimized. This minimizes size, mass, weight and resistance of the connectors used in the high-voltage circuit 250.

The low-voltage circuit 252 includes one or more temperature sensor connectors (not shown) and cell connectors 270. In the example shown, a single temperature sensor 272 is located on an end of the central interface beam 204 opposite the end where the external terminals 254 are located. This places the temperature sensor 272 along a high-voltage path and at a point furthest from the external terminals 254. This point is typically the hottest point along the high-voltage path. The temperature sensor 272 may be, for example, a razor (or JT) type thermistor or other suitable type of temperature sensor. One or more of the cell connectors 270 may be connected to the terminals of each one of the cells. As shown, the cell connectors 270 may include blade style clip connectors to mate with the external terminals 254, the terminal interconnect bars 260 and/or the crossover bar 262.

Wires (or leads) 276 associated with the temperature sensors 272 and the cell connectors 270 are routed from the low-voltage connector 244 on the low-voltage connector bracket 210, around and/or between the vent connectors 220 and the recessed sections 212, in an electrical circuit channel 278, and to respective locations along the central interface beam 204. The wires 276 that are connected to the terminals 213 may be attached to the cells 202 via the cell connectors 270 or via other techniques. For example, the wires 276 may be: attached to the terminals 213 via clips; welded to the terminals 213; soldered to the terminals 213, crimped on the terminals 213; or attached to the terminals 213 using potting or compression techniques.

Ends of the wires 276 opposite that of the temperature sensors 272 and the cell connectors 270 may be collected and attached to the low-voltage connector 244. The low-voltage connector 244 may be a quick connect/quick disconnect connector, which may be connected to a battery pack monitoring module 280. The low-voltage connector 244 may be integrally formed as part of the modular frame 110 or may be a distinct component, as shown. The battery pack monitoring module 280 may be connected to the low-voltage connector 244, monitor states of each one of the cells 202, and provide pack level cell control. The cell control may include setting charging voltages and/or currents of the cells 202, activating and/or deactivating the cells 202, discharging rates of the cells 202, etc. The cell control may be based on the states of the cells 202. The states of the cells 202 may include the temperatures and voltages of each of the cells 202. The states may further include collective voltages, currents and/or power levels of each of the cells 202.

A flex circuit and/or associated integrated circuit may be incorporated into and/or attached to the central interface beam 204, as an alternative to using temperature connectors, the cell connectors 270, the low-voltage connector 244 and/or the wires 276. As yet another alternative, the wires 276 may be replaced with conductive traces, which may be molded into the central interface beam 204.

The wires 276 may be connected to the cell connectors 270 and the temperature sensors 272 prior to the cells 202 being inserted into the modular frame 110. The wires 276 may be connected using connectors and/or soldering, welding, and/or crimping techniques. The wires 276 may be molded into the central interface beam 204.

Alternatively, the wires 276 may be connected to the temperature sensors 272 and the cell connectors 270 subsequent to cells 202 being inserted into the modular frame 110. The wires 276 may be connected and the terminal interconnect bars 260 and the crossover bar 262 may be preloaded into the modular frame 110 prior to insertion of the cells 202 into the modular frame 110. The wires 276 may be connected subsequent to installing the cells 202 into the modular frame 110 using connectors and/or soldering, welding, and/or crimping techniques.

Figure 17:
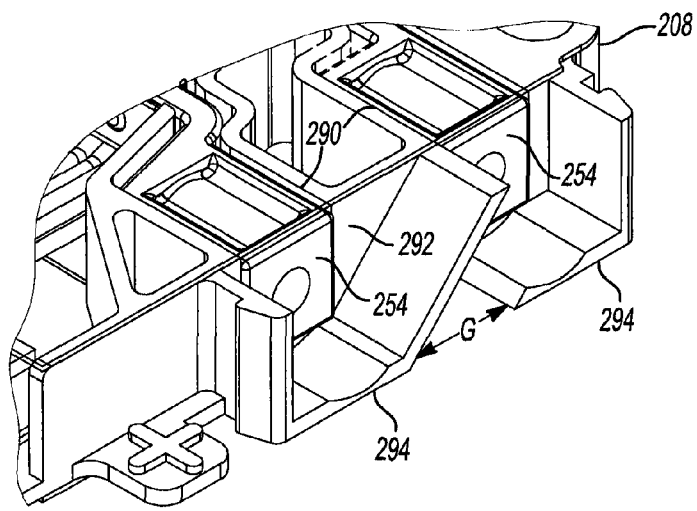
FIG. 17 is a perspective view of a the high-voltage terminal housing of the central interface beam of FIG. 14 in accordance with the present disclosure.

In FIG. 17, a perspective view of the high-voltage terminal housing 208 is shown. The high-voltage terminal housing 208 includes terminal slots 290 and an interface side 292. The terminal slots 290 receive the external terminals 254. The interface side 292 provides access to the external terminals 254. The interface side 292 includes isolating separators 294 that extend from the interface side 292 and away from the external terminals 254. The isolating separators 294 prevent shorts between the external terminals 254 and/or bus bars 296 (shown in FIG. 18) attached to the external terminals 254. The isolating separators 294 may be shaped to hold the bus bars 296. A gap G may be provided between the isolating separators 294 to allow a bus bar to cross over between and connect to opposite polarity terminals of adjacent modular frames, as shown in FIG. 18.

In FIG. 18, a front view of the battery pack system 100 of FIG. 6 is shown. FIG. 18 illustrates the bus bars 296 and a relationship between the isolating separators 294 and the bus bars 296. The bus bars 296 extend in the gaps G between the isolating separators 294. By providing the external terminals on the same side of the battery pack and by using the bus bars 296 as shown, the length, resistance, mass and weight of the bus bars is minimized. This configuration allows for the modular frames 110 to be electrically connected in series and provides two high-voltage output terminals 300 on one side of the battery pack 102. The high-voltage output terminals 300 are on an opposite side of the battery pack 102 than the cooling fluid ports 134, 136 and/or associated stacked connectors and the venting tube 240 (shown in FIG. 13). This further isolates high-voltage terminals and connectors from cooling and release fluids.

Figure 23:
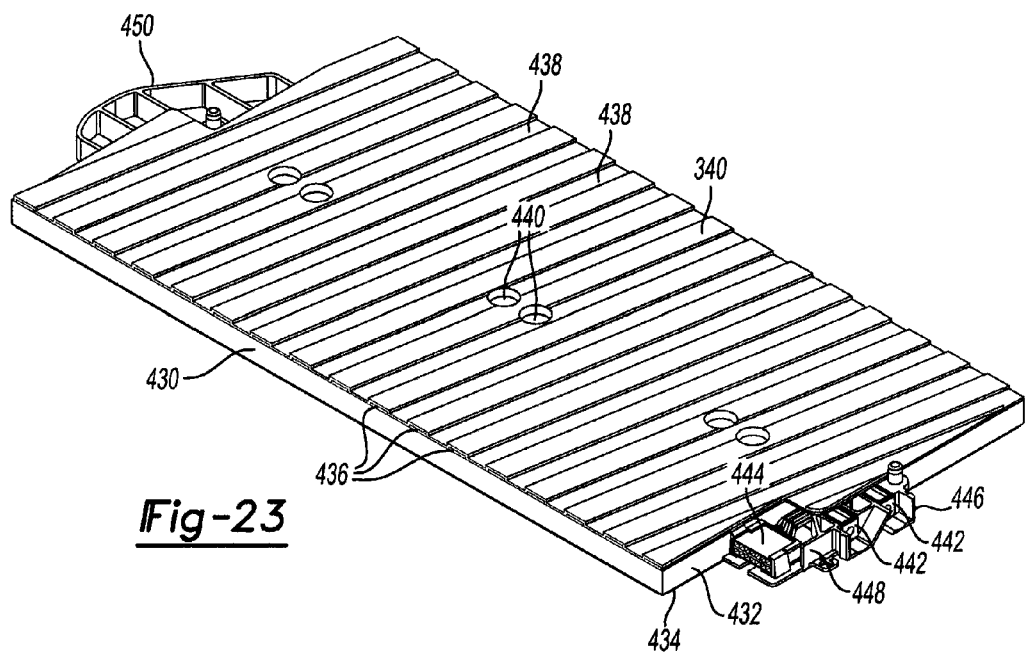
FIG. 23 is a perspective view of a modular frame with channeled cooling plates in accordance with the present disclosure.

The configuration of the cells 202 and the modular frames 110 provides flat sides with large surface areas, which may be cooled using a cooling fluid and the cooling plates 106. The flat sides of the cells 202 and modular frames 110 may be mated to either a liquid cooling plate or a gas channeled cooling plate to provide thermal management of the cells. An example liquid cooling plate 320 is shown in FIG. 21. An example gas channeled cooling plate 340 is shown in FIG. 23. The liquid cooling plates may be mated to faces of the cells of a modular frame, to every other cell face of a modular frame, or to selected ones of the faces depending upon cooling requirements.

In FIGS. 19-21, a rear perspective view of the battery pack system 100 of FIG. 6, a side perspective and cross-sectional view of a cooling connector assembly 350, and a perspective view of the modular frame 110 of FIG. 10 with the cooling plate 320 are shown. The modular frames 110 and cooling plates 106 of the battery pack system 100 are stacked to form the battery pack 102. The cooling plates 106 may be between each adjacent pair of modular frames 110, such that each of the modular frames 110 is in contact with two of the cooling plates 106. As an alternative, the cooling plates 106 may be between every other pair of adjacent ones of the modular frames 110. For example, a battery pack that includes eight modular frames may include 4 cooling plates, where each frame has a cooling plate on only one side of the modular frame, as shown in FIGS. 18 and 19.

Ends 360 of the cooling plates 106 may extend out from a side of the battery pack 102. The ends 360 may include connector portions 362 and fluid extending portions 364. The connector portions 362 connect between and to cooling fluid connectors (e.g., the connectors 130, 132). The cooling fluid connectors are stacked along with the connector portions 362 to provide a single input channel 363 with a single input 365 and a single output channel 367 with a single output (the output port 136). The input channel 363 receives a cooling fluid and the output channel 367 receives the cooling fluid in the cooling plates 106. The input channel 363 may be laterally offset from the outlet channel 367 as shown in FIG. 20. The cooling fluid connectors may include quick connect/disconnect connectors, which may include receptacle connectors 366 and insert connectors 368.

The fluid extending portions 364 extend over and are supported by the cooling plate extensions 306. The cooling plates 106 may each include a single cooling channel 370 that extends between an inlet 372 and an outlet 374 of the cooling plate 320 and across the faces of the cells of the modular frame 110. To provide a single cooling channel and to not provide a cooling channel over the central interface beam 204, a portion 376 of the cooling channel 370 extends out from a portion of the modular frame 110. The portion 376 extends from an area 378 over a first row of the cells, over the cooling plate extension 306, and to an area 380 over a second row of the cells. This provides a "U"-shaped cooling plate.

The cooling plate 320 may have mating geometry to accommodate for venting elements of the modular frame 110. For example, positioning members 382 may be connected between legs 384 of the cooling plate 320. The positioning members 382 may have holes 386 that receive the vent connectors 220. The vent connectors 220 may extend through the holes 386 and connect to other vent connectors of an adjacent modular frame.

The cooling plate 320 may be sized and positioned over the cells such that the cooling plate 320 does no introduce pressure on top sides and/or top edges (e.g., top edges 390) of the cells. The top sides of the cells have the terminals 392. The cans of the cells may be welded at the top edges. The cooling plate 320 may be sized and positioned over the cells, but not over the top sides. This prevents the cooling plate 320 from applying pressure on the welded edges due to compression of the cells and the cooling plates. The cooling plate may not be electrically grounded.

The side plates 114 of the battery pack 102 may include crash tabs 398. The crash tabs 398 provide addition lateral restraint for the modular frames 110 in the event of a vehicle crash. The compression forces exerted on the modular frames 110 and the cooling plates 106 provides lateral restraint to prevent movement of the modular frames 110 and cooling plates 106 relative to each other. Additional lateral restraint is provided by the crash tabs 398 which may be on both front and rear ends of each of the side plates 114.

In FIG. 22, a perspective view of a modular frame 400 with an integrally formed cooling channel 402 is shown. As an alternative to incorporating a cooling plate that is distinct from a modular frame, a cooling channel may be integrally formed into a modular frame. The modular frame 400 may include a cooling layer 404 that covers cell slots and faces of the cells within the modular frame 400. The cooling layer 404 includes the cooling channel 402, which may be routed primarily over the cells, not over a venting channel 406, and include a single input 408 and a single output 410. The input 408 and output 410 may be located in a port section 412 of the cooling layer 404 and include respective input and output connectors 416, 418 for mating to connectors of adjacent modular frames. A venting port 420 that receives gases from the venting channel 406 may be located in the port section 412.

In the example shown, the cooling layer 404 is disposed on a first side 422 of the modular frame 400. A cooling layer may not be disposed on a second side 424 of the modular frame 400. In this implementation, the cooling layer 404 serves multiple purposes. In addition to cooling the cells, the cooling layer 404 isolates and seals the cells within and between modular frames. The cooling layer 404 isolates the cells without the use of an isolation film layer (such as the isolation film layer 190 of FIG. 9).

In FIG. 23, a perspective view of a modular frame 430 with the channeled cooling plate 340 is shown. As an alternative to using a liquid-based cooling plate or layer (such as the cooling plate 320 of FIG. 21 or the cooling layer 404 of FIG. 22), a gas-based cooling plate may be used. The modular frame 430 shown includes a first gas-based cooling plate or the channeled cooling plate 340 on a first side 432 of the modular frame 430. A second gas-based cooling plate (not shown) may be located on a second side 434 of the modular frame 430. Each of the gas-based cooling plates includes enclosed gas channels (e.g., gas channels 436). Recessed channels 438 exist between the gas channels. This provides a ribbed configuration and supports compressive forces exerted on a battery pack. The gas channels of a first modular frame may align with gas channels or recessed channels of an adjacent modular frame. The gas channels of the first modular frame may be disposed in recessed channels of the adjacent modular frame and vice versa.

The gas-based cooling plates may include vent holes (e.g., vent holes 440). Vent connectors (not shown) of the modular frame 430 may extend through the vent holes 440 and attach to vent connectors of adjacent modular frames and/or to a vent manifold on a side of the battery pack. The gas-based cooling plates may not extend over external terminals 442, a low-voltage connector 444, a high-voltage terminal housing 446 and a low-voltage connector bracket 448 on a side of the modular frame 430. Although the modular frame 430 is shown as including an extension member 450, the modular frame 430 may not include the extension member 450, as a cooling channel is not provided by the channeled cooling plate 340 over the extension member 450.

Figure 25:
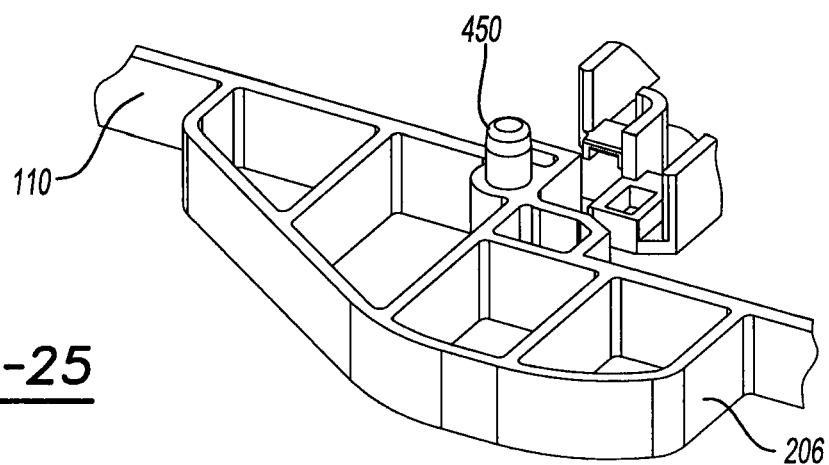
FIG. 25 is a perspective view of a keyed 6-celled modular frame in accordance with the present disclosure.

In FIGS. 24 and 25, a perspective and assembled view of keyed members of the battery pack system 100 of FIG. 6 are shown. The cooling plates, the cooling (or isolation) layers, the isolation plates and/or the end plates disclosed herein may be keyed and/or include keyed members. This provides ease in assembly, assures that components are aligned properly during assembly, and minimizes assembly errors. In the examples shown, the keyed members of the modular frames 110 include interlocking pins and/or pin sockets 450, 452. The interlocking pins and sockets 450, 452 aid in aligning adjacent modular frames relative to each other. Cooling plates of the battery pack system 100 may have corresponding mating geometry to attach to or slide over the pins 450. For example, the cooling plate 106 may include a pin receiving member 454 that extends from the cooling plate 106 and has a hole for receiving the pin 450. This is further shown in FIG. 21. The modular frames, cooling plates, the isolation plates, and/or the cooling (or isolation) layers disclosed herein may have any number of keyed members of various types and styles.

Figure 26:
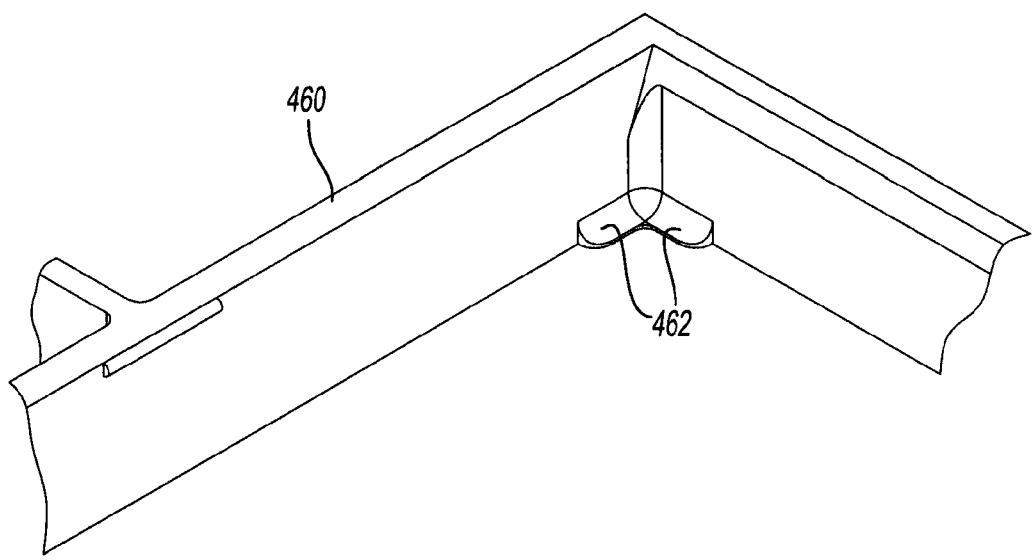
FIG. 26 is a perspective view of a portion of a modular frame illustrating tabs for maintaining cell position in accordance with the present disclosure.

In FIG. 26, a perspective view of a portion of a modular frame 460 illustrating tabs 462 for maintaining cell position is shown. The modular frames disclosed herein may include tabs on each side of the modular frames to retain cells in the modular frame and/or to maintain position of the cells.

The above-described implementations centrally locate terminals of cells within a battery pack. This contains the terminals and prevents external contact with the terminals by, for example, debris or other foreign objects. This further protects the cells and increases life of the cells.

The above-described implementations provide volumetrically efficient packaging and mass efficient packaging of a battery pack system. The implementations isolate cells without wrapping the cells. The implementations also provide a central interface beam which houses low-voltage sensors, connectors, wires, and associated circuit elements. The implementations further provide integrated venting systems for the output of cell gases. Outputs of the integrated venting systems are isolated from electrical circuit elements of the battery pack systems. The implementations herein provide improved cooling of cells and aid in maintaining cells at the same temperature.

Although the battery pack systems shown herein are configured for use within a vehicle (or vehicle system), the battery pack systems may be configured for use in other systems. A vehicle is a non-stationary system as it is capable of moving. The battery pack systems may be configured for use in, for example, stationary systems.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

When an element, component or layer is referred to herein as being "on," "engaged to," "connected to," or "coupled to" another element, component or layer, it may be directly on, engaged, connected or coupled to the other element, component or layer, or intervening elements, components or layers may be present. In contrast, when an element is referred to as being "directly on," "directly engaged to," "directly connected to," or "directly coupled to" another element, component or layer, there may be no intervening elements, components or layers present. Other words used to describe the relationship between elements, components or layers should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, portions, layers and/or sections, these elements, components, portions, layers and/or sections should not be limited by these terms. These terms may be only used to distinguish one element, component, portion, layer or section from another element, component, portion, layer or section. Terms such as "first," "second," and other numerical terms when used herein do not imply a sequence or order unless clearly indicated by the context. Thus, a first element, component, portion, layer or section discussed below could be termed a second element, component, portion, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A modular frame comprising:
a first row of cell slots configured to receive a first plurality of prismatic cells of a battery pack system;
a second row of cell slots configured to receive a second plurality of prismatic cells of the battery pack system; and
a central interface beam disposed between the first row of cell slots and the second row of cell slots, wherein the central interface beam comprises
a first side that is configured to receive terminals of the first plurality of prismatic cells, and
a second side that opposes the first side and is configured to receive terminals of the second plurality of prismatic cells.

2. The modular frame of claim 1, wherein the first plurality of prismatic cells and the second plurality of prismatic cells are lithium-ion cells.

3. The modular frame of claim 1, wherein the central interface beam comprises a vent channel that receives gases from the first plurality of prismatic cells and the second plurality of prismatic cells and directs the gases out a vent port.

4. The modular frame of claim 3, wherein:
the central interface beam comprises an electrical circuit channel configured to hold an electrical circuit; and
the vent channel is on an opposite side of the central interface beam than the electrical circuit channel.

5. The modular frame of claim 1, wherein:
the central interface beam comprises a vent connector for each one of the first plurality of prismatic cells and the second plurality of prismatic cells; and
the vent connectors are configured to connect to vent connectors of at least one frame adjacent to the modular frame to form vent channels.

6. The modular frame of claim 1, wherein:
the central interface beam comprises a channel configured to hold a circuit including a sensor and a cell connector; and
the sensor and the cell connector are used to detect a voltage and a temperature of one of the first plurality of prismatic cells.

7. The modular frame of claim 1, wherein the central interface beam comprises:
first recessed sections that receive terminals of the first plurality of prismatic cells and the second plurality of prismatic cells; and
second recessed sections that are aligned with release vents of the first plurality of prismatic cells and the second plurality of prismatic cells.

8. A battery pack system comprising:
a plurality of the modular frame of claim 1; and
a plurality of cooling plates, wherein each of the plurality of cooling plates is disposed between a respective pair of the plurality of modular frames.

9. The battery pack system of claim 8, wherein:
the cooling plates are disposed against first faces of the first plurality of prismatic cells and against second faces of the second plurality of prismatic cells;
the first faces are sides of the first plurality of prismatic cells with greatest surface area; and
the second faces are sides of the second plurality of prismatic cells with greatest surface area.

10. The battery pack system of claim 9, wherein each of the cooling plates comprises a cooling channel that extends over the first plurality of prismatic cells and the second plurality of prismatic cells and not over the central interface beam.

11. The battery pack system of claim 9, wherein each of the cooling plates is formed as a layer of a respective one of the plurality of modular frames.

12. The battery pack system of claim 9, wherein:
each of the plurality of modular frames comprises vent connectors that receives gases from the first plurality of prismatic cells and the second plurality of prismatic cells; and
the vent connectors of each of the modular frames connect to each other to form vent channels that extend from and terminate at a first side of the battery pack system and connect to a vent manifold on a second side of the battery pack system.

13. The battery pack system of claim 12, wherein:
the vent manifold comprises a vent tube; and
the vent tube is on an opposite side of the battery pack system than electrical circuit elements of the battery pack system.

14. The battery pack system of claim 13, wherein the electrical circuit elements comprise:
external terminals that are connected to the first plurality of prismatic cells and the second plurality of prismatic cells; and
a connector that is connected to at least one of a sensor and a cell connector, wherein the sensor detects a temperature of at least one of the first plurality of prismatic cells and the second plurality of prismatic cells, and wherein the cell connector is used to detect a voltage of one of the first plurality of prismatic cells.

15. The battery pack system of claim 9, further comprising:
cooling plates disposed between selected ones of the plurality of modular frames; and
fluid connectors connected to the cooling plates and on an opposite side of the battery pack system than electrical circuit elements of the battery pack system.

16. The battery pack system of claim 15, wherein the fluid connectors are stackable to connect with each other to form an inlet fluid channel and an outlet fluid channel.

17. The battery pack system of claim 9, wherein the plurality of modular frames comprises keyed members that align the plurality of modular frames relative to each other.

18. The battery pack system of claim 17, further comprising cooling plates disposed between selected ones of the plurality of modular frames,
wherein the keyed members align the cooling plates relative to the plurality of modular frames.

19. The battery pack system of claim 9, further comprising:
end plates on a first side and a second side of the battery pack system; and
side plates on a third side and a fourth side of the battery pack system, wherein the plurality of modular frames are compressed between the end plates and held in compression via the side plates.

* * * * *